US012746181B2

(12) United States Patent
Hayakawa

(10) Patent No.: US 12,746,181 B2
(45) Date of Patent: Sep. 29, 2026

(54) PILL CONTAINER

(71) Applicant: Nippon Shinyaku Co., Ltd., Kyoto (JP)

(72) Inventor: Masaki Hayakawa, Kanazawa (JP)

(73) Assignee: Nippon Shinyaku Co., Ltd., Kyoto (JP)

( * ) Notice: Subject to any disclaimer, the term of this patent is extended or adjusted under 35 U.S.C. 154(b) by 371 days.

(21) Appl. No.: 18/555,200

(22) PCT Filed: Mar. 30, 2022

(86) PCT No.: PCT/JP2022/015926

§ 371 (c)(1),
(2) Date: Oct. 12, 2023

(87) PCT Pub. No.: WO2022/220122

PCT Pub. Date: Oct. 20, 2022

(65) Prior Publication Data

US 2024/0197565 A1 Jun. 20, 2024

(30) Foreign Application Priority Data

Apr. 13, 2021 (JP) ................................ 2021-067874

(51) Int. Cl.
*B65D 83/04* (2006.01)
*A61J 1/03* (2023.01)
(Continued)

(52) U.S. Cl.
CPC ............... *A61J 1/03* (2013.01); *A61J 7/0076* (2013.01); *G03G 9/0821* (2013.01);
(Continued)

(58) Field of Classification Search
CPC .... A61J 1/03; A61J 7/0076; A61J 7/02; A61J 7/0084; A61J 7/04; A61J 1/1412;
(Continued)

(56) References Cited

U.S. PATENT DOCUMENTS 716,257 A 12/1902 Lunt
783,477 A 2/1905 Strauss
(Continued)

FOREIGN PATENT DOCUMENTS

CA 2130881 A1 2/1996
CN 2858550 Y 1/2007
(Continued)

OTHER PUBLICATIONS

JP-2009098926-A, English Translation by EPO, accessed Dec. 11, 2025 (Year: 2009).*
(Continued)

*Primary Examiner* — King M Chu
(74) *Attorney, Agent, or Firm* — Foley & Lardner LLP

(57) ABSTRACT

A pill container includes a plurality of pill accommodation portions each extending in a first direction and having a volume allowing a predetermined plurality of pills to be accommodated therein. The plurality of pill accommodation portions each include a pair of wall portions extending in the first direction and placed so as to oppose each other. At least one of the pair of wall portions is formed in a corrugated plate shape in which a plurality of mountain portions projecting inwardly toward the other wall portion and a plurality of outwardly recessed valley portions are alternately repeated along the first direction.

9 Claims, 19 Drawing Sheets

(51) Int. Cl.
*A61J 7/00* (2006.01)
*G03G 9/08* (2006.01)
*G03G 9/087* (2006.01)

(52) U.S. Cl.
CPC ..... *G03G 9/08706* (2013.01); *G03G 9/08735* (2013.01); *G03G 9/08755* (2013.01)

(58) Field of Classification Search
CPC ............. G03G 9/0821; G03G 9/08706; G03G 9/08735; G03G 9/08755; B65D 83/0409; B65D 2583/0481; B65D 2583/0495; B65D 2583/0422; B65D 2583/0409; B65D 83/0463; B65D 2215/02; B65D 83/0481; B65D 83/049
USPC ................. 222/452; 206/538, 536, 1.5, 531; 221/263, 265, 264, 112, 122
See application file for complete search history.

(56) References Cited

U.S. PATENT DOCUMENTS 2,013,901 A 9/1935 Shankland
2,236,224 A 3/1941 Raschkind
2,275,566 A 3/1942 Slaten
2,673,777 A 3/1954 Ward
2,683,554 A 7/1954 Mulhauser, Jr.
2,701,078 A 2/1955 Bowman
2,886,208 A 5/1959 Sinclair
2,886,209 A 5/1959 Lermer
2,919,796 A 1/1960 Pressl
2,962,190 A 11/1960 Horland
3,159,308 A 12/1964 Passavanti
3,289,885 A 12/1966 Villaveces
3,358,818 A 12/1967 Davis
3,527,383 A 9/1970 Borsum et al.
3,586,208 A 6/1971 Hussey
3,606,965 A 9/1971 Cortley et al.
3,622,041 A 11/1971 Borsum et al.
3,627,160 A 12/1971 Horvath
3,836,055 A 9/1974 Katzmark et al.
4,027,781 A 6/1977 Covert
4,127,190 A 11/1978 Sunnen
4,150,766 A * 4/1979 Westendorf ........ B65D 83/0409 221/265
4,154,365 A 5/1979 Lorca
4,228,920 A 10/1980 Burton
4,230,236 A 10/1980 Boulter
4,282,990 A 8/1981 Miyashita
4,283,000 A 8/1981 White
4,288,006 A 9/1981 Clover, Jr.
4,381,059 A 4/1983 Schurman
4,530,447 A 7/1985 Greenspan
4,572,376 A 2/1986 Wrennall
4,653,668 A 3/1987 Borders et al.
4,744,492 A 5/1988 Hackmann et al.
4,805,765 A 2/1989 Barrett et al.
4,807,757 A 2/1989 Rappaport et al.
4,848,593 A 7/1989 Jeandaud
4,971,203 A 11/1990 Weinstein
4,984,709 A 1/1991 Weinstein
5,018,644 A 5/1991 Hackmann et al.
5,020,719 A 6/1991 Roth et al.
5,076,444 A 12/1991 Syms
5,108,006 A 4/1992 Tieke et al.
5,405,047 A 4/1995 Hansen
5,443,204 A 8/1995 O'Donnell et al.
5,467,903 A 11/1995 Sorensen et al.
5,540,266 A 7/1996 Grau et al.
5,667,097 A * 9/1997 Joyce ................. B65D 83/0409 221/93
5,755,357 A 5/1998 Orkin et al.
5,845,816 A 12/1998 Krane
5,915,589 A 6/1999 Lim
6,085,937 A 7/2000 Hutchinson et al.
6,168,046 B1 1/2001 Galesi
6,267,265 B1 7/2001 Issa
6,763,971 B1 7/2004 Tong
6,824,011 B1 11/2004 Woempner
7,182,219 B2 2/2007 Chang
7,240,795 B2 7/2007 Lee
7,424,960 B1 9/2008 Vokac
9,150,346 B1 10/2015 Aramian
9,656,796 B1 5/2017 Cammarata
10,099,841 B2 10/2018 Reinhold et al.
10,364,089 B2 7/2019 Daniels et al.
10,744,068 B2 8/2020 Sita et al.
10,758,455 B2 9/2020 Fisher et al.
11,744,778 B2 9/2023 Israeli
2002/0036209 A1 3/2002 Chang
2004/0124204 A1 7/2004 Giraud
2008/0011773 A1 1/2008 Tobias
2008/0251531 A1 10/2008 Coe et al.
2009/0095649 A1* 4/2009 Costa ................. B65D 83/0463 206/530
2009/0194556 A1 8/2009 Klein et al.
2011/0147404 A1 6/2011 Dobie
2011/0192863 A1 8/2011 Barrass et al.
2012/0006700 A1 1/2012 Geboers et al.
2014/0339250 A1 11/2014 Dalpian
2017/0036846 A1 2/2017 Bressan et al.
2017/0242976 A1 8/2017 Howieson et al.
2020/0189833 A1 6/2020 French
2022/0227567 A1 7/2022 Hayakawa

FOREIGN PATENT DOCUMENTS

CN 102596725 A 7/2012
CN 211282184 U 8/2020
CN 212607022 U 2/2021
EP 1 847 475 A2 10/2007
GB 0 364 159 A 1/1932
JP S41-023738 Y1 12/1966
JP S43-011088 Y1 5/1968
JP S48-003004 Y1 1/1973
JP S48-007450 U 1/1973
JP S53-089581 A 8/1978
JP S53-146652 U 11/1978
JP S54-063987 A 5/1979
JP S55-067482 U 10/1980
JP H05-044877 U 6/1993
JP H08-002510 A 1/1996
JP 2008-133001 A 6/2008
JP 2009098926 A * 5/2009
JP 2010-047298 A 3/2010
JP 2011-046439 A 3/2011
JP 2011-093596 A 5/2011
JP 2015-067308 A 4/2015
JP 2016-011145 A 1/2016
JP 2017-534540 A 11/2017
JP 2019-043590 A 3/2019
JP 2020-097427 A 6/2020
JP 2020-179861 A 11/2020
WO WO-2009/149268 A1 12/2009
WO WO-2013/172487 A1 11/2013
WO WO-2016/059428 A2 4/2016
WO WO-2020/217994 A1 10/2020

OTHER PUBLICATIONS

Extended European Search Report dated Jan. 31, 2025 in EP 22788047.3.
Office Action dated May 15, 2025 in CA 3, 137,526.
Non-Final Office Action dated Sep. 26, 2024 in U.S. Appl. No. 18/591,359.
Non-Final Office Action dated Sep. 26, 2024 in U.S. Appl. No. 18/591,369.
Extended European Search Report dated Dec. 15, 2022 for EP 20796264.8.
Final Office Action dated Jul. 18, 2023 in U.S. Appl. No. 17/605,611.
International Preliminary Report on Patentability dated May 11, 2023 in PCT/JP2021/040115, with English translation.

(56) References Cited

OTHER PUBLICATIONS

International Preliminary Report on Patentability dated Nov. 4, 2021 in PCT/JP2020/015819, with English translation.
International Preliminary Report on Patentability dated Oct. 26, 2023 in PCT/JP2022/015926, with English translation.
International Search Report dated Dec. 14, 2021 in PCT/JP2021/040115.
International Search Report dated Jul. 7, 2020 in PCT/JP2020/015819.
International Search Report dated May 10, 2022 in PCT/JP2022/015926.
Non-Final Office Action dated Dec. 5, 2023 in US Sn U.S. Appl. No. 17/605,611.
Non-Final Office Action dated Jan. 18, 2023 in US Sn U.S. Appl. No. 17/605,611.
Notification of Reasons for Refusal of JP 2019-081980 dated Mar. 28, 2023.
Office Action dated Jul. 29, 2025 in European Application No. 20796264.8.
Notice of Preliminary Rejection in KR 10-2021-7033921 dated Nov. 18, 2024, with English translation.
Notification of Reasons for Refusal in JP 2021-067874 dated Dec. 3, 2024, with English translation.
Office Action and Search Report dated Sep. 12, 2025 in CN 202280028118.8, with machine and partial English translations.
Notification of Grounds for Rejection issued Apr. 25, 2025 in KR 10-2021-7033921, with English translation.
Office Action dated Jan. 10, 2026 in CN 202280028118.8, with English machine translation.
Non-Final Office Action dated Aug. 24, 2026 in U.S. Appl. No. 19/232,346.

* cited by examiner

PILL CONTAINER

CROSS-REFERENCE TO RELATED APPLICATIONS

This application is the U.S. National Stage of PCT/JP2022/015926, filed Mar. 30, 2022, which claims priority to JP 2021-067874, filed Apr. 13, 2021.

TECHNICAL FIELD

The present invention relates to a pill container.

BACKGROUND ART

There is a need for pill containers, such as measuring containers and fixed quantity take-out containers, for taking out a dosage of pills to be taken by a person who takes pills. For example, PATENT DOCUMENT 1 discloses a pill container that can set the number of pills that can be accommodated therein, to a desired number.

CITATION LIST

Patent Document

[PATENT DOCUMENT 1] Japanese Laid-Open Patent Publication No. 2020-179861

SUMMARY OF THE INVENTION

Problems to be Solved by the Invention

In the conventional technology disclosed in PATENT DOCUMENT 1, a plurality of pills are accommodated in a straight line in each pill accommodation portion, and thus the dimensional error of each pill is accumulated in the direction of this straight line. Accordingly, the number of pills accommodated in the pill accommodation portion may deviate from the desired number.

An object of the present invention is to provide a pill container that can accommodate a desired number of pills in each pill accommodation portion more accurately than in the conventional technology.

Solution to the Problems

A pill container according to an aspect of the present invention includes a plurality of pill accommodation portions each extending in a first direction and having a volume allowing a predetermined plurality of pills to be accommodated therein, wherein the plurality of pill accommodation portions each include a pair of wall portions extending in the first direction and placed so as to oppose each other, and at least one of the pair of wall portions is formed in a corrugated plate shape in which a plurality of mountain portions projecting inwardly toward the other wall portion and a plurality of outwardly recessed valley portions are alternately repeated along the first direction.

Advantageous Effects of the Invention

The pill container according to the present invention can accommodate a desired number of pills in the pill accommodation portion more accurately than in the conventional technology.

DETAILED DESCRIPTION

Figure 1:
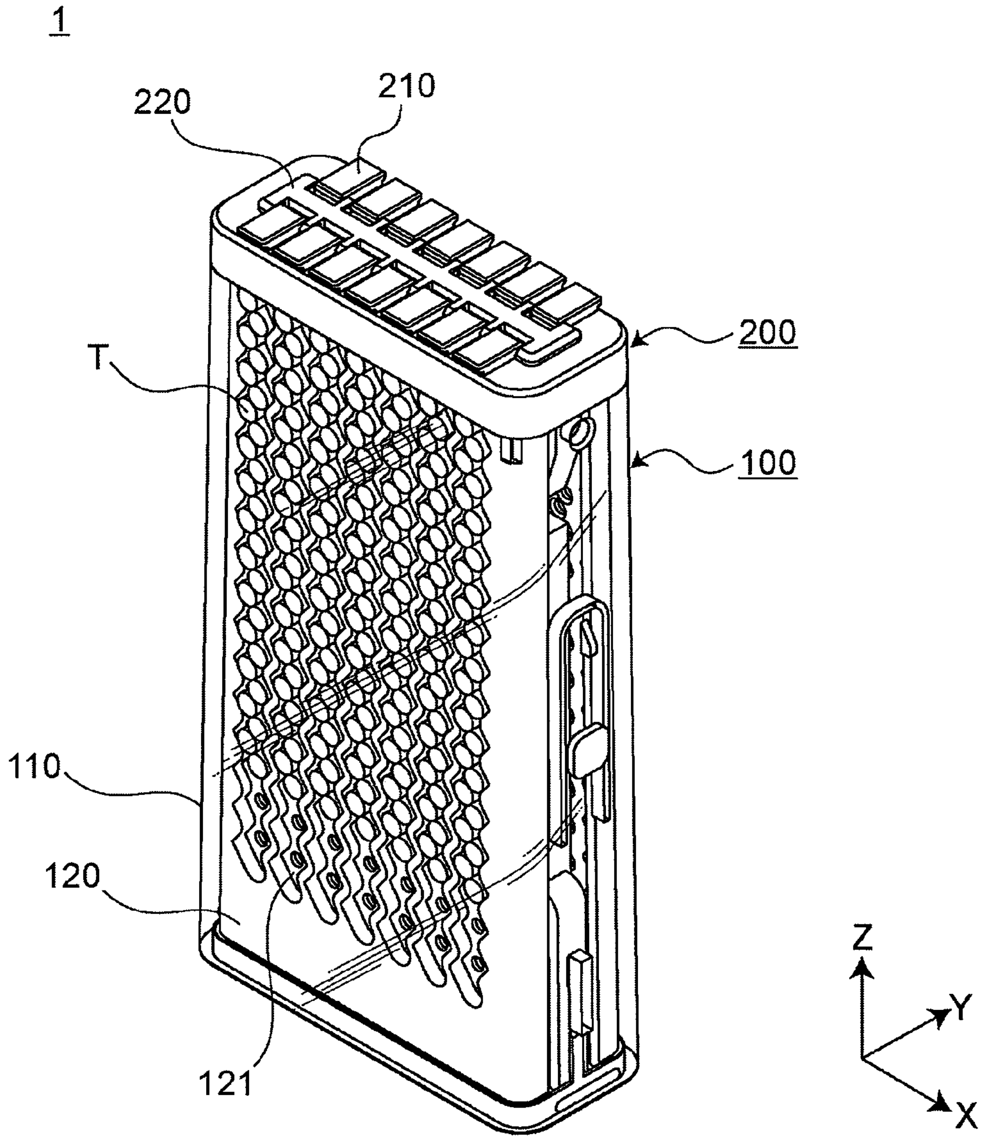
FIG. 1 is a perspective view of a pill container 1 according to an embodiment of the present invention.

A first aspect of the present invention provides a pill container including a plurality of pill accommodation portions each extending in a first direction and having a volume allowing a predetermined plurality of pills to be accommodated therein, wherein the plurality of pill accommodation portions each include a pair of wall portions extending in the first direction and placed so as to oppose each other, and at least one of the pair of wall portions is formed in a corrugated plate shape in which a plurality of mountain portions projecting inwardly toward the other wall portion and a plurality of outwardly recessed valley portions are alternately repeated along the first direction.

A second aspect of the present invention provides the pill container according to the first aspect, wherein each of the pill accommodation portions has a pill passage hole allowing the plurality of pills to pass therethrough, at an upper end thereof which is one end in the first direction, the pill container further includes a pill number setting member movable in the first direction within each of the pill accommodation portions, and the pill number setting member is configured to be capable of changing a volume between the pill passage hole and the pill number setting member in each of the pill accommodation portions by moving in the first direction in each of the pill accommodation portions.

A third aspect of the present invention provides the pill container according to the second aspect, wherein each of the pill accommodation portions is provided with a plurality of attachment holes aligned at equal intervals in the first direction, and the pill number setting member is configured to be detachably inserted into one of the plurality of attachment holes and prevent the pills from moving in the first direction.

A fourth aspect of the present invention provides the pill container according to the third aspect, wherein a number n of the plurality of attachment holes in each of the pill accommodation portions is equal to a sum of a number of the plurality of mountain portions and a number of the plurality of valley portions of each of the pill accommodation portions, a first attachment hole located at a lowermost portion among the plurality of attachment holes is located below a first valley portion located at a lowermost portion among the plurality of valley portions, and an mth attachment hole located at an mth position from a bottom (here, m is an integer which is not less than 2 and not greater than n) among the plurality of attachment holes is located between an (m−1)th valley portion located at an (m−1)th position from the bottom among the plurality of valley portions and an (m−1)th mountain portion located at an (m−1)th position from the bottom among the plurality of mountain portions.

A fifth aspect of the present invention provides the pill container according to the third aspect or the fourth aspect, wherein the plurality of pill accommodation portions are aligned in a second direction crossing the first direction, and the plurality of attachment holes are aligned in the second direction.

A sixth aspect of the present invention provides the pill container according to any one of the second to fifth aspects, further including a cap configured to be capable of individually opening and closing the pill passage hole of each of the pill accommodation portions.

A seventh aspect of the present invention provides the pill container according to any one of the first to sixth aspects, wherein the other of the pair of wall portions extends substantially in a straight manner in the first direction.

An eighth aspect of the present invention provides the pill container according to any one of the first to sixth aspects, wherein the other of the pair of wall portions is formed in a corrugated plate shape in which a plurality of mountain portions projecting inwardly toward the one wall portion and a plurality of outwardly recessed valley portions are alternately repeated along the first direction, and the pair of wall portions are parallel along the first direction such that positions of the mountain portions of the one wall portion and positions of the valley portions of the other wall portion in the first direction coincide with each other.

A ninth aspect of the present invention provides the pill container according to the eighth aspect, wherein a component, in a direction perpendicular to the first direction, of a distance between the mountain portions of the one wall portion and the mountain portions of the other wall portion is smaller than a distance between a mountain portion of the one wall portion and a valley portion of the one wall portion adjacent to said mountain portion.

Hereinafter, a pill container according to an embodiment of the present invention will be described with reference to the drawings. In the present embodiment, the same components are denoted by the same reference characters, and the description thereof is omitted.

1. Configuration

Figure 2:
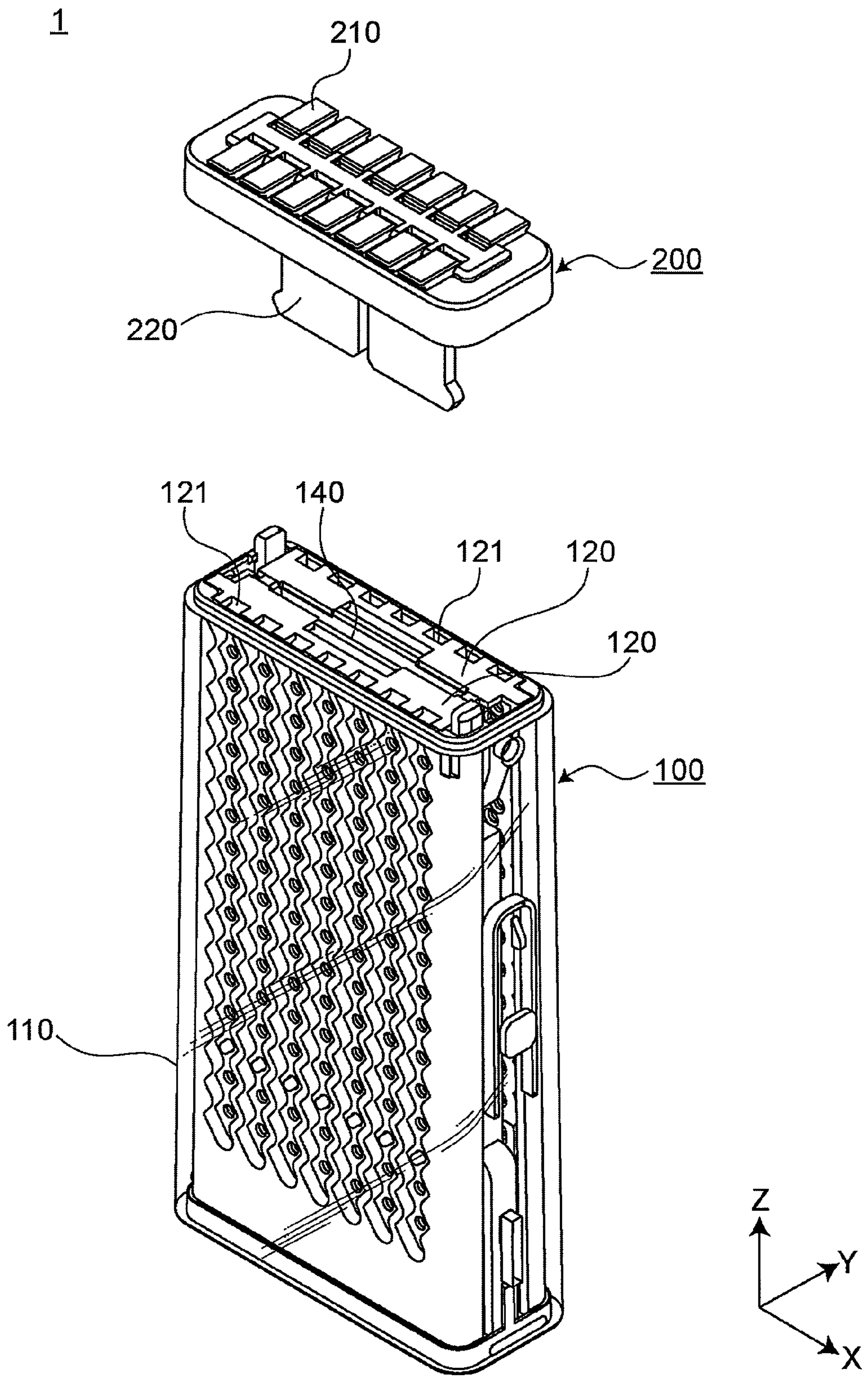
FIG. 2 is an exploded perspective view of the pill container 1 in FIG. 1.

FIG. 1 is a perspective view of a pill container 1 according to the present embodiment. The pill container 1 includes a container body 100 and a lid 200. FIG. 2 is an exploded perspective view of the pill container 1 in FIG. 1. FIG. 2 shows a state where the lid 200 is detached from the container body 100. For convenience of description, FIG. 1 shows the pill container 1 in a state where pills T are accommodated therein, while FIG. 2 shows the pill container 1 in a state where no pills T are accommodated therein.

For convenience of description, FIG. 1 and FIG. 2, and FIGS. 3 to 6, etc., which will be described later, show X, Y, and Z axes which are orthogonal to each other. In the present specification, the Z axis positive direction is also referred to as upward direction, and the Z axis negative direction is also referred to as downward direction. In a state during normal use illustrated in FIG. 1, the Z axis is parallel to the vertical direction. In addition, in the present specification, terms indicating directions, such as "up", "down", "front", "back", "right", and "left", are used, assuming the state during normal use. However, these terms do not mean to limit a use state, etc., of the present invention.

As shown in FIG. 1 and FIG. 2, the container body 100 includes 14 pill pockets 121. The pill pockets 121 are an example of "pill accommodation portions" of the present disclosure. Each pill pocket 121 extends in the Z direction (first direction). In the illustrated example, each pill pocket 121 has a volume that allows 1 to 32 pills T to be accommodated therein. A pill passage hole that allows the pills T to pass therethrough is provided at the upper end of each pill pocket 121.

The lid 200 includes 14 hinge cap portions 210 corresponding to the 14 pill pockets 121, respectively. Each hinge cap portion 210 is configured to be capable of opening and closing the corresponding pill pocket 121. The lid 200 includes an insertion member 220, and is detachably attached to the container body 100 by inserting the insertion member 220 into a support member 140 described later.

Figure 3:
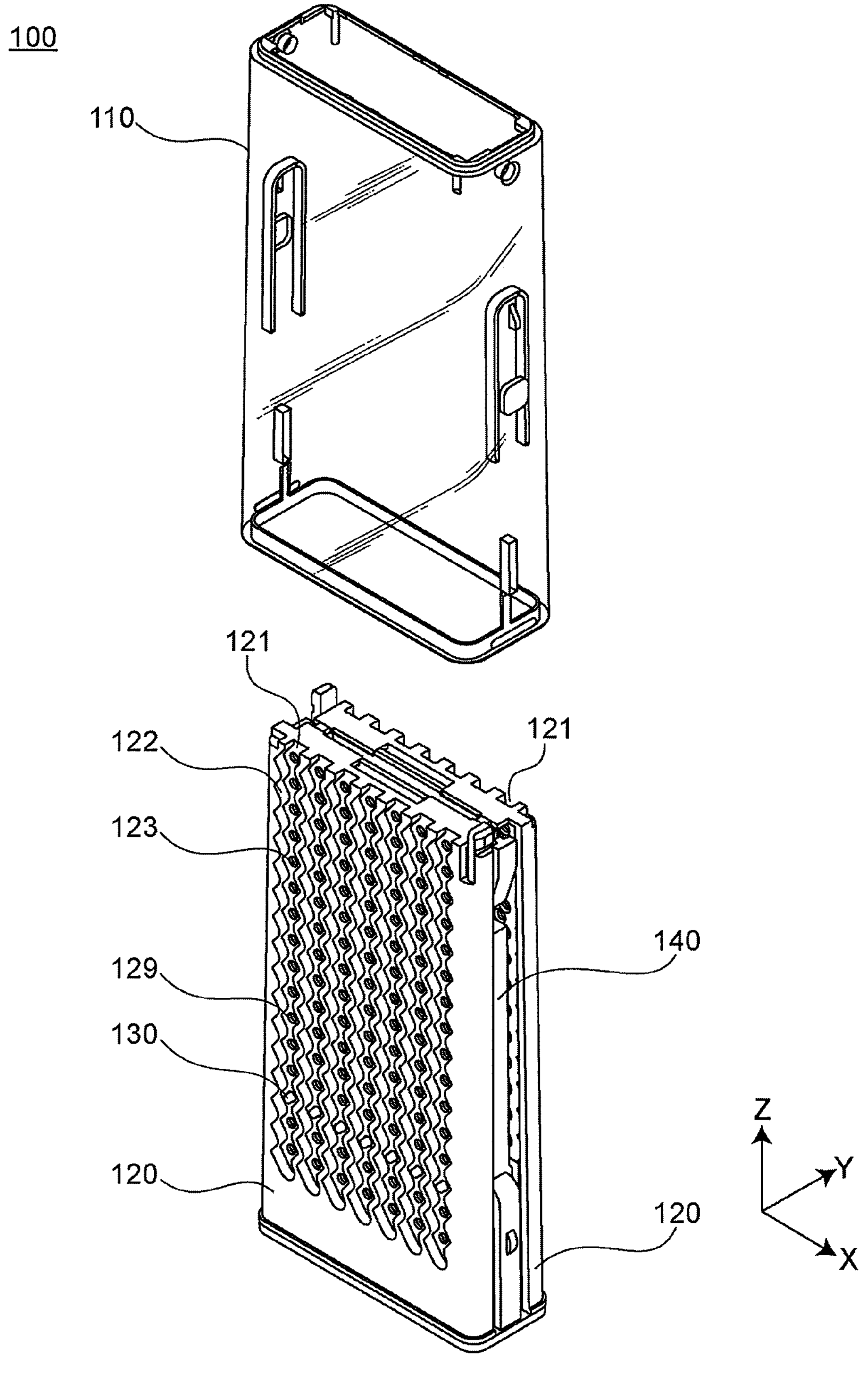
FIG. 3 is an exploded perspective view of a container body 100 in FIG. 2.

FIG. 3 is an exploded perspective view of the container body 100 in FIG. 2. The container body 100 includes the support member 140 and two pocket members 120 assembled as shown in FIG. 3, and a case 110 covering these members. The case 110 may be composed of a transparent material such that accommodated pills can be seen.

Figure 4:
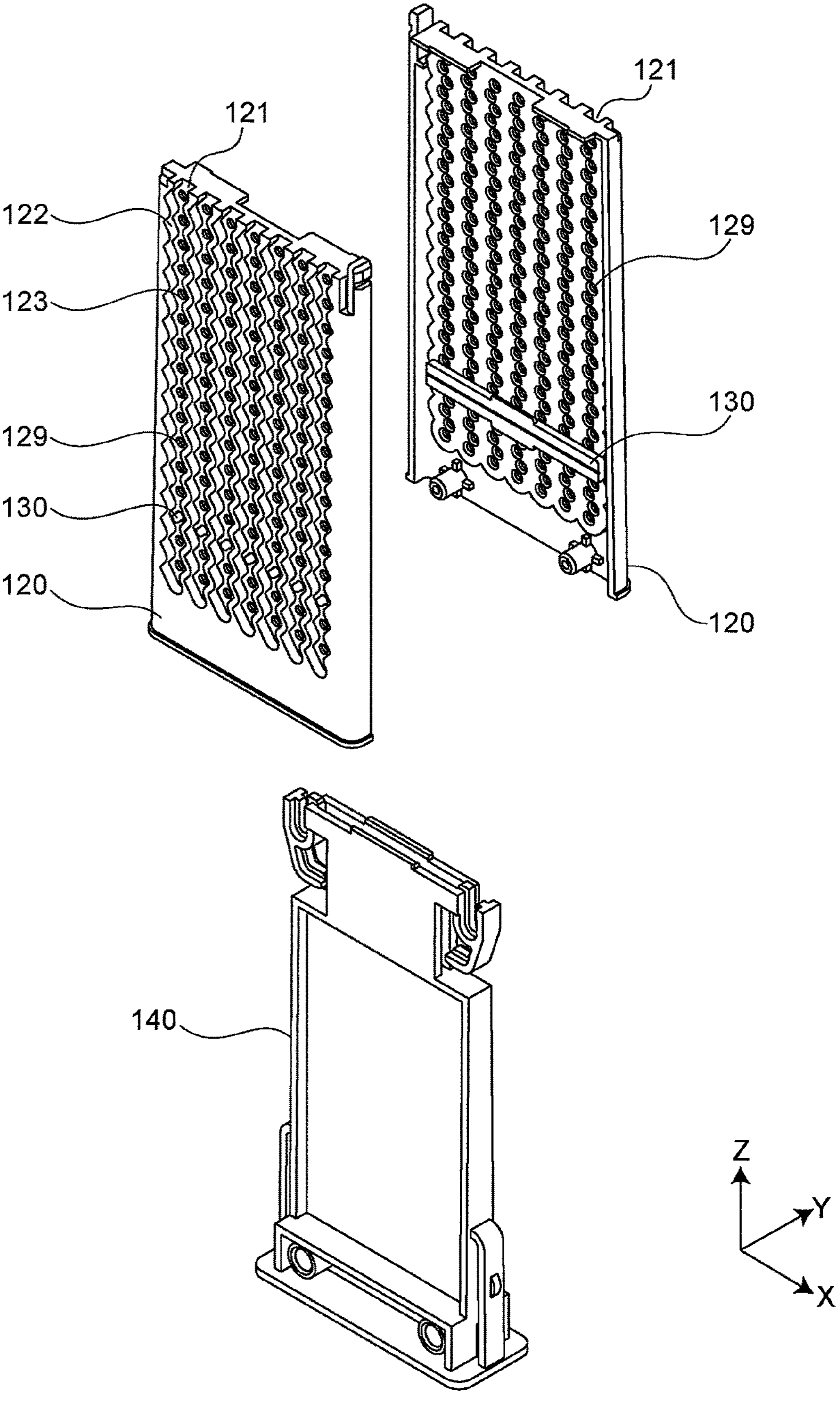
FIG. 4 is an exploded perspective view of a support member 140 and two pocket members 120 in FIG. 3.

FIG. 4 is an exploded perspective view of the support member 140 and the two pocket members 120 in FIG. 3. As shown in FIG. 3 and FIG. 4, the two pocket members 120 are attached to the support member 140 such that the support member 140 is sandwiched therebetween. Each pocket member 120 is provided with seven pill pockets 121 aligned in the X direction.

The X direction is an example of a "second direction" of the present disclosure. The second direction crosses the first direction, and, for example, the X direction, which is an example of the second direction, is orthogonal to the Z direction, which is an example of the first direction.

Each pill pocket 121 has 32 attachment holes 129. Therefore, each pocket member 120 is provided with a total of 224 attachment holes 129. A pill number setting member 130 is inserted into the attachment holes 129.

Figure 5:
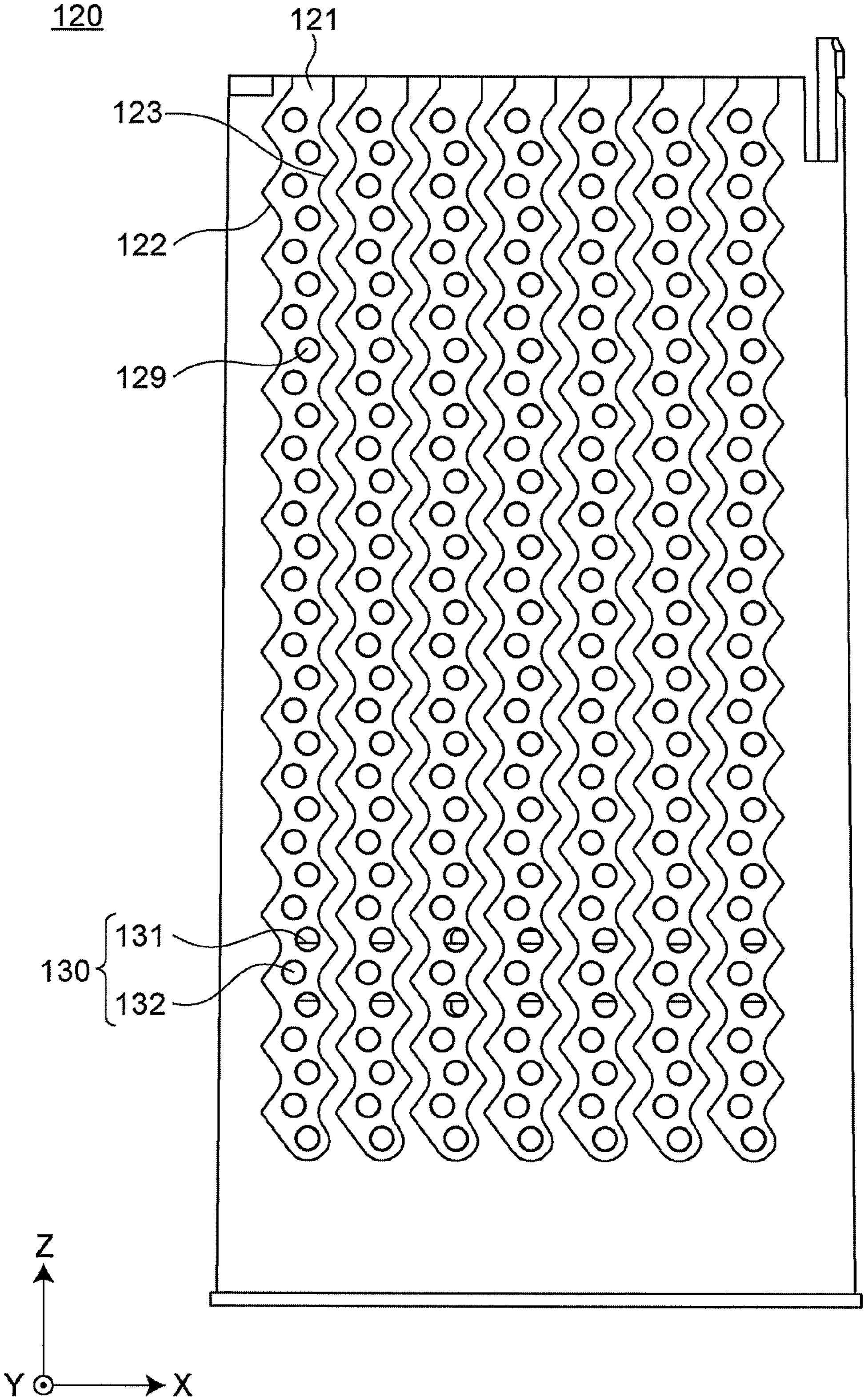
FIG. 5 is a front view of the pocket member 120 in FIG. 4.

FIG. 5 is a front view of the pocket member 120 in FIG. 4. Each pill pocket 121 has a left wall 122 and a right wall 123. The left wall 122 and the right wall 123 extend in the Z direction and are placed so as to oppose each other. The left wall 122 and the right wall 123 are an example of a "pair of wall portions" of the present disclosure. The left wall 122 and the right wall 123 are each formed in a corrugated plate shape. That is, in each of the left wall 122 and the right wall 123, inwardly projecting mountain portions and outwardly recessed valley portions are alternately repeated as advancing in the Z direction.

The "pair of wall portions" of the present disclosure, for example, the left wall 122 and the right wall 123, may be continuous wall surfaces as shown, but are not limited thereto. The "pair of wall portions" may be configured in any form that does not allow the pills T to pass therethrough, and may be configured as obstacles such as non-continuous protrusions, or may be wall portions formed in a mesh shape.

The left wall 122 and the right wall 123 are parallel along the Z axis. That is, the periods of the corrugated plate shapes formed by the left wall 122 and the right wall 123 are substantially the same. The phases of the corrugated plate shapes formed by the left wall 122 and the right wall 123 are also substantially the same, and the Z positions of the mountain portions of the left wall 122 substantially coincide with the Z positions of the corresponding valley portions of the right wall 123. By having the left wall 122 and the right wall 123 having such corrugated plate shapes, the pills T accommodated in each pill pocket 121 are aligned in a zigzag manner along the Z direction as shown in FIG. 1.

For example, in FIG. 5, the component in the X direction of the distance between the mountain portions of the left wall 122 and the mountain portions of the right wall 123 is smaller than the distance between a mountain portion of the left wall 122 and the valley portion of the left wall 122 adjacent to this mountain portion.

The positions of the attachment holes 129, for example, the center positions of the attachment holes 129, will be described with reference to FIG. 5. The number n of attachment holes 129 in each pill pocket 121 is equal to the sum of the number of mountain portions and the number of valley portions of the left wall 122. The first attachment hole 129 located at a lowermost portion is located below the first valley portion located at a lowermost portion. An mth attachment hole located at an mth position (here, m is an integer which is not less than 2 and not greater than n) from the bottom among the plurality of attachment holes 129 is located between an (m−1)th valley portion located at an (m−1)th position from the bottom among the plurality of valley portions and an (m−1)th mountain portion located at an (m−1)th position from the bottom among the plurality of mountain portions.

Figure 6:
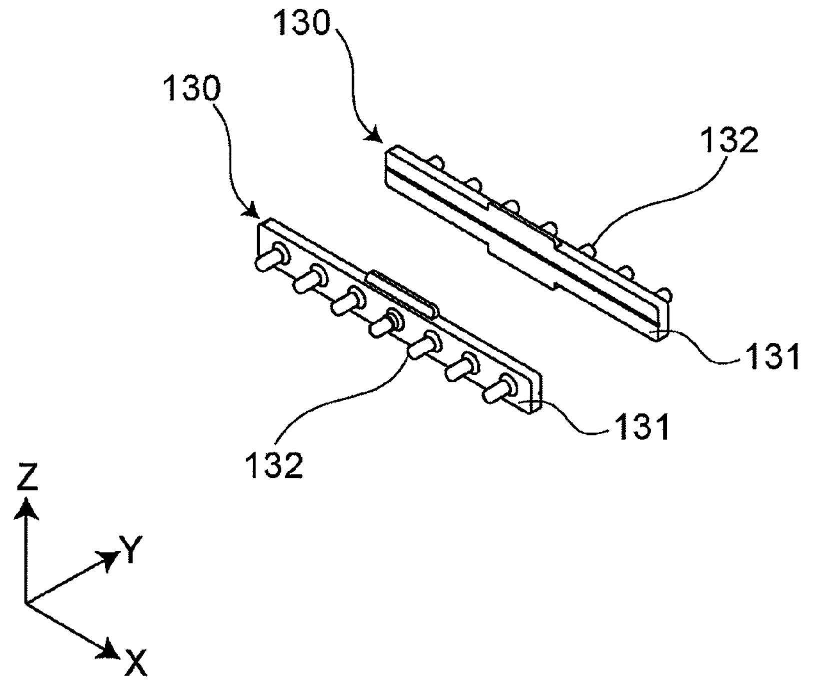
FIG. 6 is a perspective view showing two pill number setting members 130 shown in FIG. 4.

FIG. 6 is a perspective view showing the two pill number setting members 130 shown in FIG. 4. Each pill number setting member 130 includes a plate-shaped base 131 having a longitudinal direction that is the X direction, and seven protrusions 132 projecting from the surface of the base 131. The number of protrusions 132 is equal to the number of pill pockets 121 of the pocket member 120. The seven protrusions 132 are detachably inserted into the corresponding attachment holes 129 of the different pill pockets 121, respectively (see FIG. 5). The protrusions 132 penetrate the attachment holes 129 and enter the pill pockets 121, thereby preventing the pills T supplied from above from moving downward from the protrusions 132.

2. Operation

The operation of the pill container 1 will be described below with reference to FIGS. 2 to 10. First, as shown in FIG. 4, the pill number setting members 130 are inserted into the two pocket members 120 from the inside to be attached to the two pocket members 120, respectively.

In the illustrated example, when each pill number setting member 130 is attached by inserting the pill number setting member 130 into the lowest attachment holes 129 of the pocket member 120, 32 pills T can be accommodated in each pill pocket 121. The number of pills T that can be accommodated in each pill pocket 121 decreases by one each time the stage of the attachment holes 129 into which the pill number setting member 130 is inserted is higher by one. When the pill number setting member 130 is attached by inserting the pill number setting member 130 into the highest attachment holes 129 (the 32nd attachment holes 129 from the bottom), the number of pills T that can be accommodated in each pill pocket 121 is one. In the example in FIG. 4, each pill number setting member 130 is inserted into the sixth attachment holes 129 from the bottom, so that the number of pills T that can be accommodated in each pill pocket 121 is 27.

As described above, each pill number setting member 130 is configured to be movable in the up-down direction within each pill pocket 121. By moving in the up-down direction, the pill number setting member 130 can change the volume between the pill passage hole and the protrusion 132 of the pill number setting member 130 in each pill pocket 121. A pill number setting operator who performs such a pill number setting operation is, for example, medical staff such as a doctor and a pharmacist.

Next, as shown in FIG. 3, the pill number setting operator attaches the two pocket members 120 to the support member 140 such that the two pocket members 120 sandwich the support member 140, and then covers the two pocket members 120 with the case 110 from above.

Figure 7:
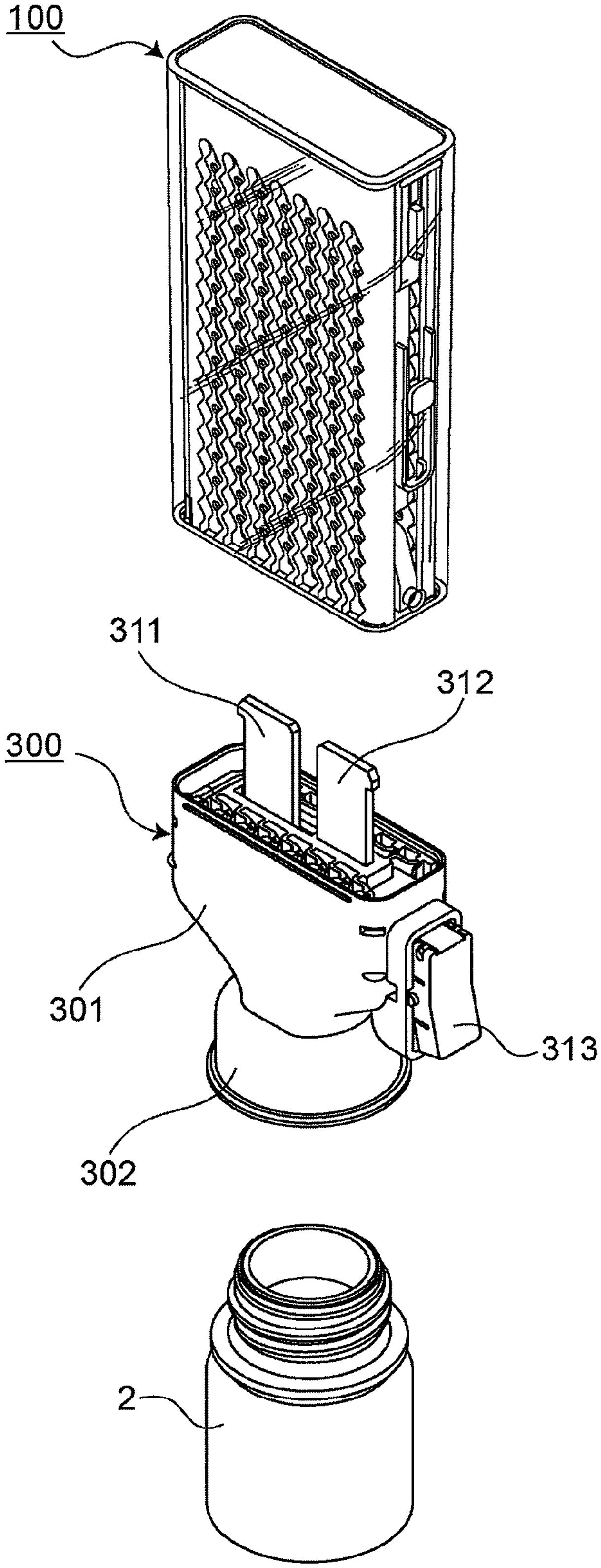
FIG. 7 is an exploded perspective view showing a state of assembly of the container body 100 in FIG. 1, a loading jig 300, and a pill bottle 2.
Figure 8:
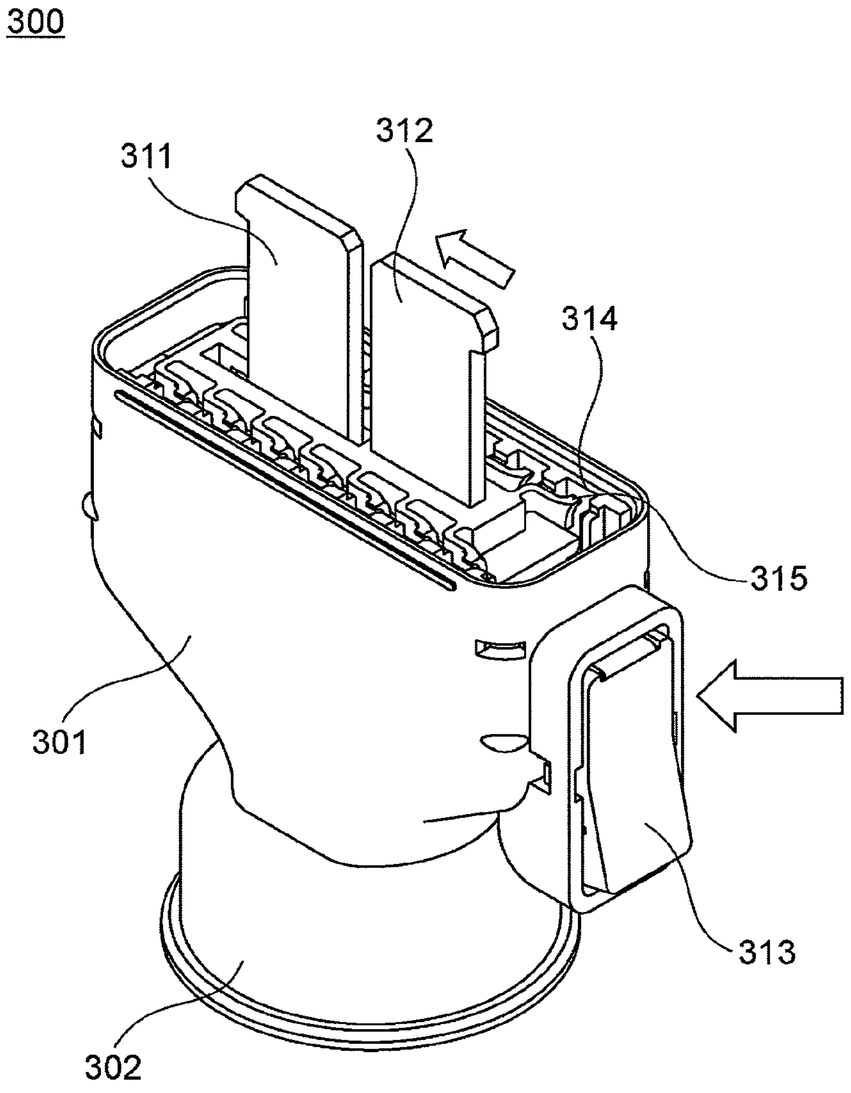
FIG. 8 is a perspective view showing the loading jig 300 in FIG. 7.

Next, the pills T are loaded into each pill pocket 121. For the pill loading operation, for example, a loading jig 300 shown in FIG. 7 may be used. A pill loading operator who performs the pill loading operation is, for example, medical staff such as a doctor and a pharmacist. FIG. 7 is an exploded perspective view showing a state of assembly of the container body 100 in FIG. 1, the loading jig 300, and a pill bottle 2. FIG. 8 is a perspective view showing the loading jig 300 in FIG. 7.

In FIG. 7 and FIG. 8, the loading jig 300 includes a body 301 and a pill container attachment portion 302 which is attached to the pill bottle 2. A plurality of pills T are accommodated in the pill bottle 2. The pill container attachment portion 302 is detachably attached to the pill bottle 2, for example, by means of a screw.

The loading jig 300 further includes a movable insertion member 311 and a fixed insertion member 312 which project in the Z direction from the body 301. The pill loading operator detachably attaches the loading jig 300 to the container body 100 by inserting the movable insertion member 311 and the fixed insertion member 312 into the support member 140 (e.g., see FIG. 2) of the container body 100.

As shown in FIG. 8, the loading jig 300 is provided with 14 pill paths 314, the number of which is equal to the number of pill pockets 121. Each pill path 314 allows the pills T to pass therethrough in the up-down direction in the drawing sheets of FIG. 7 and FIG. 8.

The loading jig 300 further includes pill stoppers 315 which are configured to be capable of closing the pill paths 314 such that no pills T pass through the pill paths 314. Each pill stopper 315 is directly or indirectly connected to a switch 313, and can be switched between a closed state where the pill path 314 is closed and an opened state where the pill path 314 is opened, by the pill loading operator switching the switch 313. Each pill path 314 is opened in the example in FIG. 7, and is closed in the example in FIG. 8.

Figure 9:
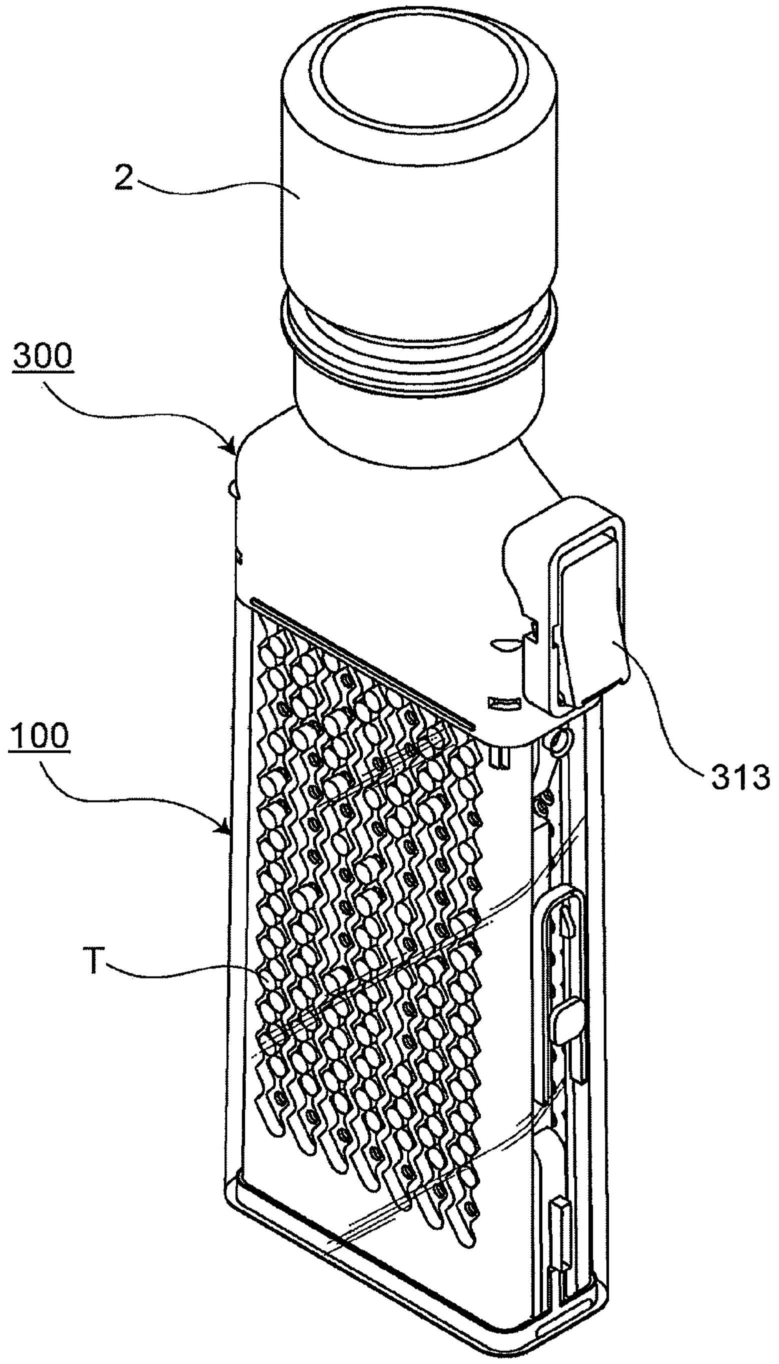
FIG. 9 is a perspective view schematically showing a loaded state of pills T.

FIG. 9 is a perspective view schematically showing a loaded state of the pills T. When the pill bottle 2, the loading jig 300, and the container body 100 are assembled as shown in FIG. 7 and then inverted, the state shown in FIG. 9 is reached. In FIG. 9, each pill path 314 is opened, and the pills T in the pill bottle 2 are loaded into the pill pockets 121 of the container body 100 through the pill paths 314 of the loading jig 300. In order to ensure that the pills T smoothly enter the pill pockets 121 of the container body 100 after passing through the pill paths 314, the shape of one end (upper end in FIG. 8) of each pill path 314 of the loading jig 300 is formed so as to be substantially identical to the shape of the pill passage hole of the pill pocket 121. Thus, the loading jig 300 includes a mechanism for aligning the pills T in the direction in which the pills T are accommodated in each pill pocket 121.

After confirming that the pills T are loaded without gaps, the pill loading operator switches the switch 313 to close each pill path 314, and then detaches the loading jig 300 from the container body 100. In the closed state, the pills T from the pill bottle 2 do not pass through the interior of the loading jig 300, so that no pill spills out even in a state where the pill bottle 2 is inverted as shown in FIG. 9.

Next, the pill number setting operator attaches the lid 200 to the container body 100 by inserting the insertion member 220 into the support member 140 as shown in FIG. 2. Through the above operation, the pill-loaded pill container 1 as shown in FIG. 1 is completed. The pill-loaded pill container 1 is handed over from medical staff such as a doctor and a pharmacist to a user such as a person who takes pills T.

Figure 10:
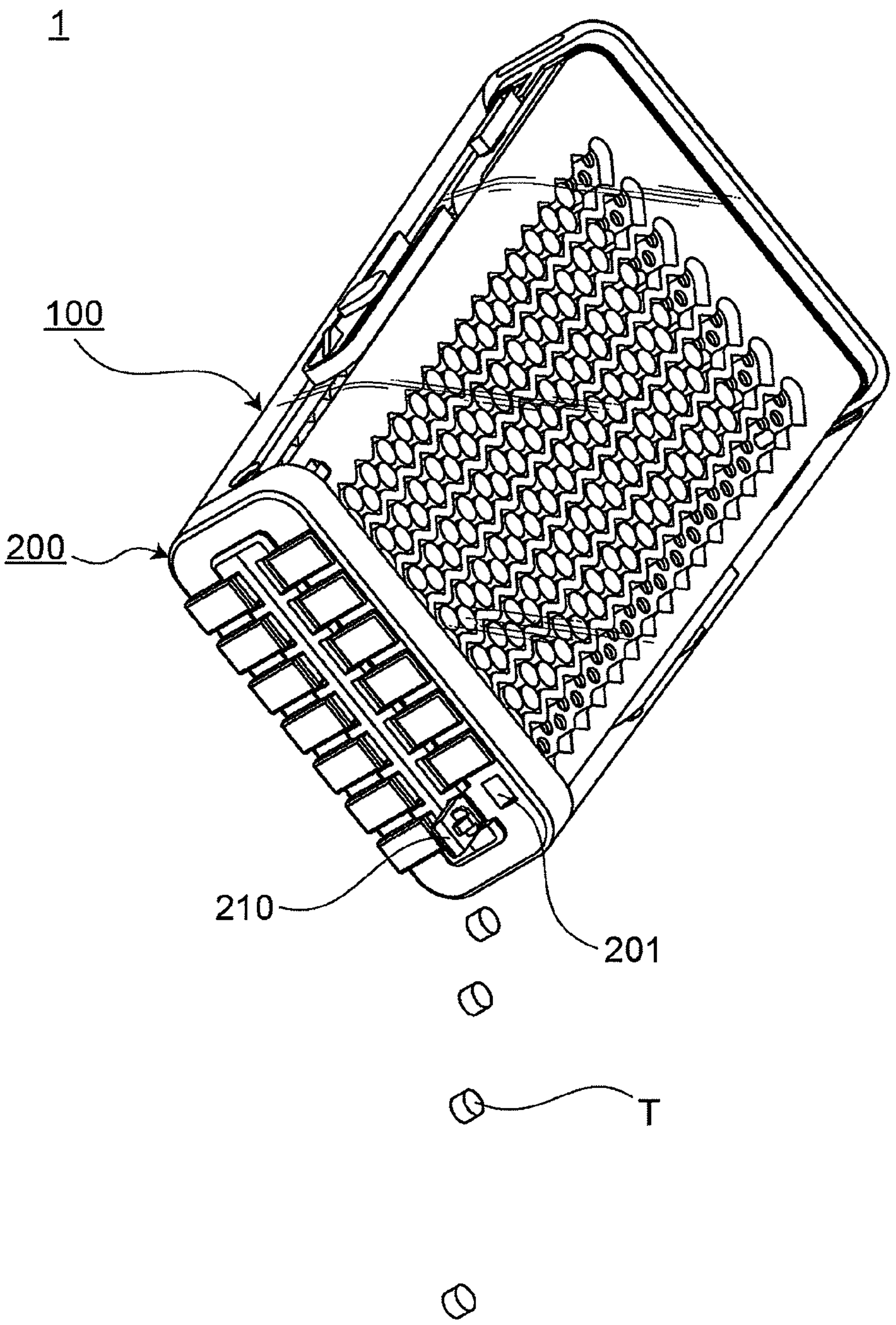
FIG. 10 is a schematic perspective view for describing an example of an operation of taking out the pills T from the pill container 1 in FIG. 1.

FIG. 10 is a schematic perspective view for describing an example of an operation of taking out the pills T from the pill container 1 in FIG. 1. As shown in FIG. 10, by opening one hinge cap portion 210 and inverting the pill container 1, the user can take out the pills T accommodated in the pill pocket 121 corresponding to the opened hinge cap portion 210, through a pill passage hole 201. Therefore, if the number of pills T accommodated in each pill pocket 121 is set to a single dose for the user, the user can take out a single dose of pills T by merely inverting the pill container 1. Accordingly, the user does not have to perform the taking-out operation while counting the pills T, so that the troublesome operation can be reduced. In addition, the risk of the user miscounting the pills T and taking an inappropriate number of pills T can also be reduced.

Since the container body 100 includes the 14 pill pockets 121, for example, 14 doses of pills, which is equivalent to the dose for a week in the case of taking pills twice a day, in morning and at night, can be stored without additional pill loading.

3. Details of Configuration of Pill Pocket 121

Figure 11A:
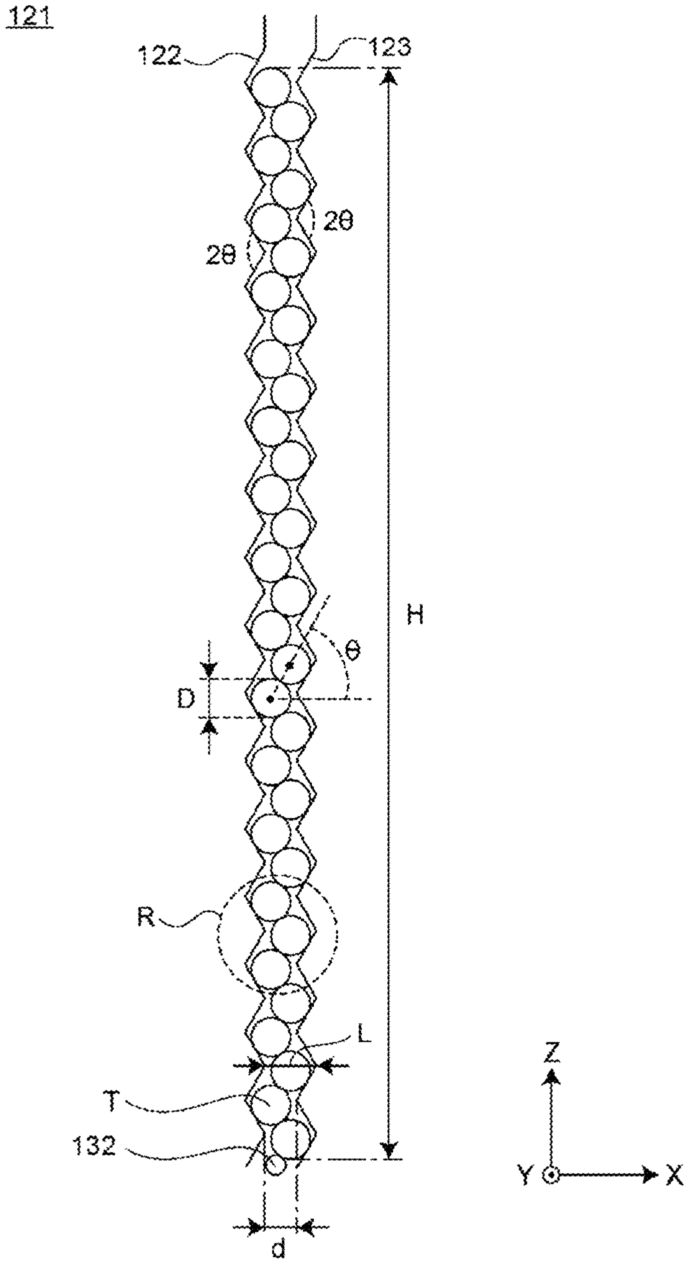
FIG. 11A is a schematic diagram illustrating a configuration of a pill pocket 121.

FIG. 11A is a schematic diagram illustrating a configuration of the pill pocket 121. For convenience of description, FIG. 11A schematically shows only one of the plurality of pill pockets 121 shown in FIG. 5.

As shown in FIG. 11A, the lowest pill T is placed on the protrusion 132 of the pill number setting member 130. The pills T are accommodated in series in the pill pocket 121. As shown in FIG. 11A, an angle formed between two line segments connecting a mountain portion of the left wall 122 and the two valley portions adjacent to this mountain portion is 2θ. Similarly, an angle formed between two line segments connecting a mountain portion of the right wall 123 and the two valley portions adjacent to this mountain portion is also 20.

In a state where the pills T are loaded, the odd-numbered pills T from the bottom are supported by the right wall 123 and the pills T adjacent thereto on the lower side. However, the lowest pill T (first pill T from the bottom) is supported by the protrusion 132 of the pill number setting member 130 and the right wall 123. The even-numbered pills T from the bottom are supported by the left wall 122 and the pills T adjacent thereto on the lower side. With this configuration, a straight line passing through the center of an even-numbered pill T from the bottom and the center of the pill T that is in contact with this even-numbered pill T on the upper side forms an angle of θ with respect to the X direction perpendicular to the Z direction in which the pill pocket 121 extends. θ is, for example, not less than 30° and not greater than 75°, and is, for example, 45°, or, for example, 60°.

In this configuration example, a total height H from the lower end of the lowest pill T (first pill T from the bottom) to the upper end of the highest pill T (ith pill T from the bottom) is represented by the following equation (1)

$$H = (i-1)D\sin\theta + D \tag{1}$$

where D denotes the diameter of the cylindrical type pill T.

According to the equation (1), for example, if i=32, D=3.0 mm, and θ=60°, H=83.54 mm, and if i=32, D=3.0 mm, and θ=45°, H=68.76 mm.

In FIG. 11A, a component d in the X direction of the distance between the mountain portions of the left wall 122 and the mountain portions of the right wall 123 is smaller than the distance L between a mountain portion of the left wall 122 and a valley portion of the left wall 122 adjacent to this mountain portion. For example, the distance d is smaller than the diameter D of the pill T. For example, if the diameter D of the pill T is 3.0 mm, the distance d is set to be not less than 2.0 mm and less than 3.0 mm. For example, if D=3.0 mm and θ=60°, the distance d is set to 2.43 mm, and if D=3.0 mm and θ=45°, the distance d is set to 2.55 mm.

Figure 11B:
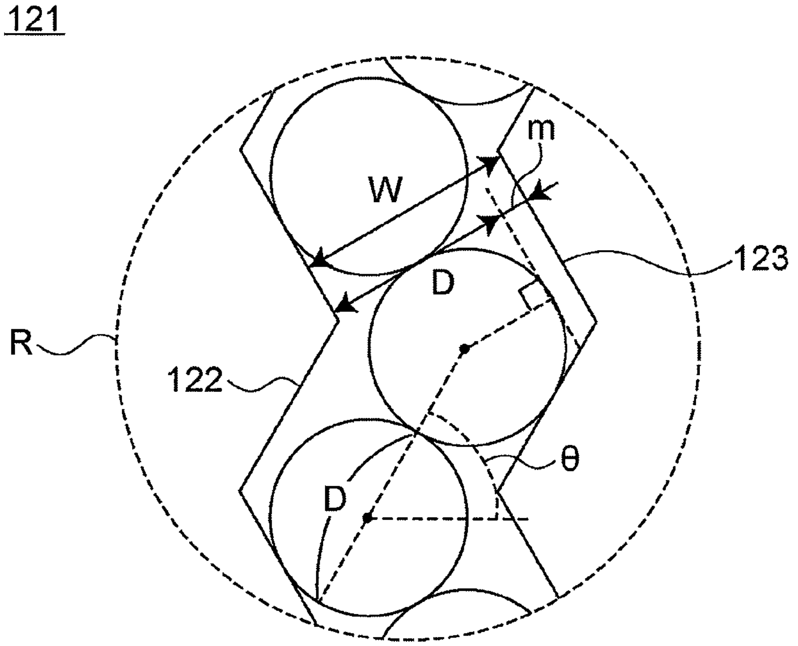
FIG. 11B is a partially enlarged view of a region R in FIG. 11A.

FIG. 11B is a partially enlarged view of a region R in FIG. 11A. The dimensions of the pills T may vary depending on the manufacturing accuracy. In addition, the pills T may expand due to the moisture contained therein due to the dampness of the surrounding environment. In order to allow the pills T to be accommodated even in the case where the dimensions of the pills T vary as described above, a distance W between the parallel left and right walls 122 and 123 of the pill pocket 121 may be set to a value obtained by adding a margin value m to the diameter D of the pill T. m is set to, for example, 2% to 20% of the diameter D of the pill T. Accordingly, even when, for example, the pills T contain moisture and expand, the pill pocket 121 can accommodate therein the set number of pills T.

Figure 11C:
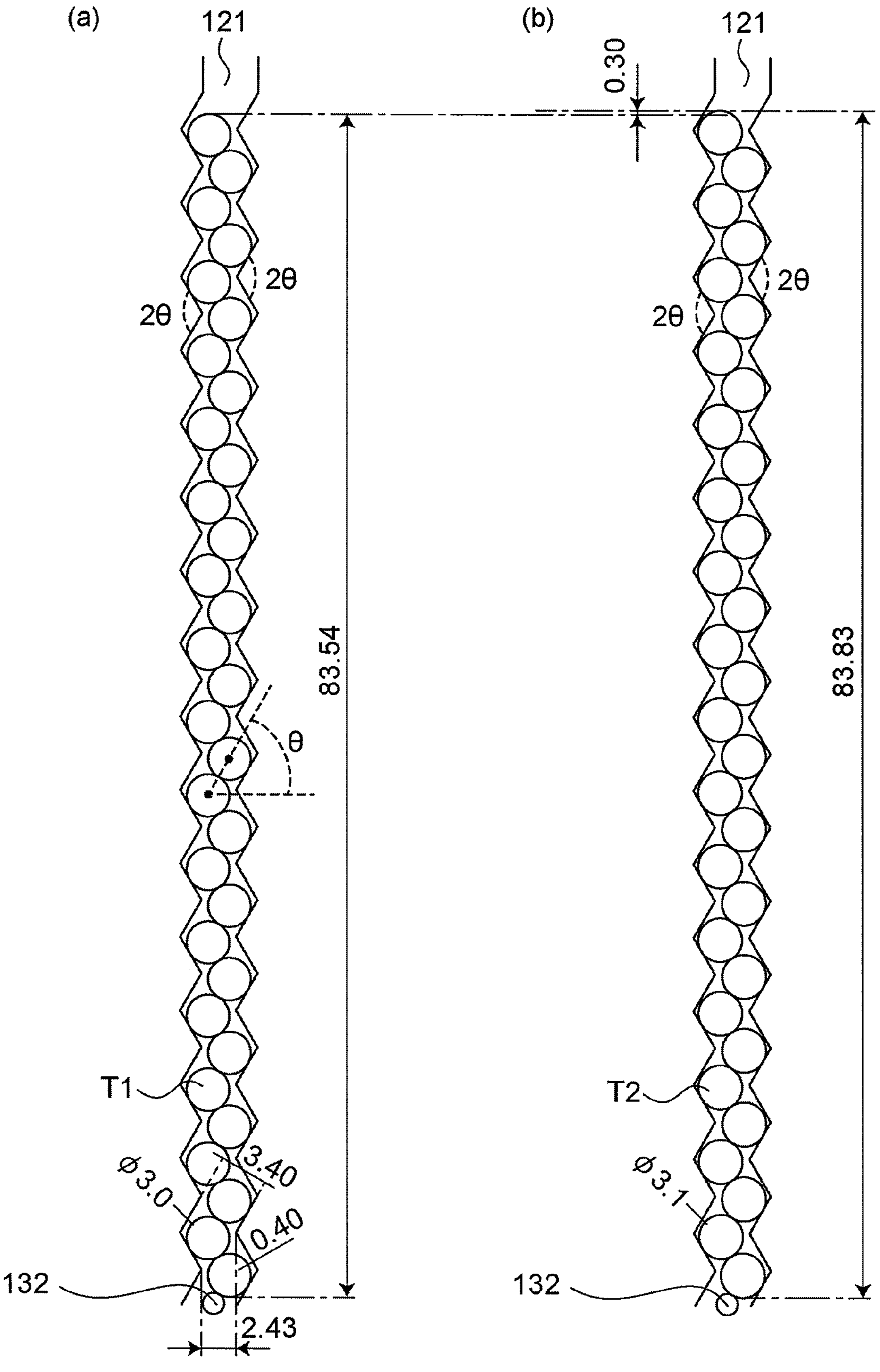
FIG. 11C shows schematic diagrams for comparing and describing states where pills of dimensions different from each other are accommodated in the pill pocket 121 in FIG. 11A.

FIG. 11C shows schematic diagrams for comparing and describing states where pills of dimensions different from each other are accommodated in the pill pocket 121 in FIG. 11A. The left diagram (a) of FIG. 11C is a schematic diagram illustrating a configuration of the pill pocket 121 as in FIG. 11A. The left diagram (a) of FIG. 11C is a schematic diagram of the pill pocket 121 in the case where i=32, D (diameter φ of each pill T1)=3.0 mm, and θ=60°. The right diagram (b) of FIG. 11C is a schematic diagram in the case where 32 pills T2 having a diameter of 3.1 mm are accommodated in the same pill pocket 121 as in the left diagram (a) of FIG. 11C.

In the case where i=32, D=3.0 mm, and θ=60° as described above, if the margin value m is set to 0.40 mm for the pill pocket 121 configured such that H=83.54 mm, when the pills T2 expand such that D'=3.1 mm, a total height H' from the lower end of the lowest pill T2 to the upper end of the highest pill T2 is 83.83 mm as shown in the right diagram (b) of FIG. 11C. The value of H' is different from 86.33 mm which is the value of H obtained by equation (1) in the case where i=32, D=3.1 mm, and θ=60°. This is due to the fact that an angle, with respect to the X direction, of a straight line passing through the center of an even-numbered pill T2 from the bottom and the center of the pill T2 that is in contact with this even-numbered pill T2 on the upper side is slightly smaller than 60° due to the increase in the diameter D of each pill T2 and the presence of the margin value m.

Thus, the pills T2 are accommodated in a zigzag manner along the Z direction in the pill pocket 121, and due to the presence of the margin value m, even when the pills T2 expand, the increase in the total height from the lower end of the lowest pill T2 to the upper end of the highest pill T2 can be reduced.

4. Effects, Etc.

As described above, the pill container 1 according to the present embodiment includes the plurality of pill pockets 121 each extending in the Z direction and having a volume allowing a predetermined plurality of pills T to be accommodated therein. The plurality of pill pockets 121 each have the left wall 122 and the right wall 123 which are an example of the pair of wall portions each extending in the 7, direction and placed so as to oppose each other. The left wall 122 and the right wall 123 are each configured in a corrugated plate shape in which a plurality of mountain portions projecting inwardly toward the other wall portion and a plurality of outwardly recessed valley portions are alternately repeated along the Z direction.

With this configuration, the pills T are accommodated in a zigzag manner in each pill pocket 121 along the left wall 122 or the right wall 123 having a corrugated plate shape, so that accumulation of the dimensional errors of the pills T in the Z direction can be reduced as compared to the case where the pills T are accommodated in a straight line in the Z direction. Therefore, a deviation of the number of pills T accommodated in the pill pocket 121 from a desired number due to accumulation of the dimensional errors of the pills T can be prevented, and the desired number of pills T can be accommodated in the pill pocket 121 more accurately than in the conventional technology.

When the pills T are accommodated in a straight line unlike the pill container 1 according to the present embodiment, for example, an external force, such as the weights of all the pills T accommodated above the lowest accommodated pill T, is applied to this pill T, and the pill T may be broken by this external force. On the other hand, in the pill container 1 according to the present embodiment, the pills T accommodated in each pill pocket 121 are each not only in contact with the pill T therebelow and but also in contact with the left wall 122 or the right wall 123. Therefore, an external force applied to each pill T, such as the weights of the pills T accommodated above this pill T, is not only applied to this pill T but also distributed to the left wall 122 or the right wall 123. Therefore, with the pill container 1 according to the present embodiment, the risk of breaking the pill T by the external force can be reduced.

In the pill container 1 according to the present embodiment, each pill pocket 121 has a pill passage hole that allows the pills T to pass therethrough, at the upper end thereof which is one end in the Z direction. The pill container 1 may further include the pill number setting member 130 which is movable in the Z direction within each pill pocket 121. The pill number setting member 130 is configured to be capable of changing the volume between the pill passage hole and the pill number setting member 130 in each pill pocket 121 by moving in the Z direction within the pill pocket 121.

Conventionally, depending on the number of pills in a dose to be taken by a pill-taking person, it has been necessary to manufacture a pill container or a fixed quantity take-out container for taking out the number of pills in a dose. For example, if there are two pill-taking persons, one having a dose of 10 pills and the other having a dose of 20 pills, it has been necessary to manufacture both a pill container for taking out 10 pills at one time and a pill container for taking out 20 pills at one time, and store both pill containers as inventory. On the other hand, in the pill container 1 according to the present embodiment, the number of pills that can be accommodated in each pill pocket 121 can be set to a desired number. Therefore, there is no need to design and manufacture pill containers having various shapes and store the pill containers as inventory, so that the manufacturing cost and the storage space for inventory can be reduced.

In the pill container 1 according to the present embodiment, each pill pocket 121 may be provided with the plurality of attachment holes 129 aligned at equal intervals in the Z direction. The pill number setting member 130 is configured to be detachably inserted into one of the plurality of attachment holes 129 and prevent the pills T from moving in the Z direction.

With this configuration, the number of pills T that can be accommodated in each pill pocket 121 can be set finely by selecting an attachment hole 129 into which the pill number setting member 130 is inserted.

In the pill container 1 according to the present embodiment, the number n of the plurality of attachment holes 129 in each pill pocket 121 may be equal to the sum of the number of the plurality of mountain portions and the number of the plurality of valley portions of each pill pocket 121. The first attachment hole 129 located at the lowermost portion among the plurality of attachment holes 129 is located below the first valley portion located at the lowermost portion among the plurality of valley portions. The mth attachment hole 129 located at the mth position from the bottom among the plurality of attachment holes 129 is located between the (m−1)th valley portion located at the (m−1)th position from the bottom among the plurality of valley portions and the (m−1)th mountain portion located at the (m−1)th position from the bottom among the plurality of mountain portions.

With this configuration, the number of pills T that can be accommodated in each pill pocket 121 can be set more finely by selecting an attachment hole 129 into which the pill number setting member 130 is inserted, from among the n attachment holes 129.

In the pill container 1 according to the present embodiment, the plurality of pill pockets 121 may be aligned in the X direction, and therefore, the plurality of attachment holes 129 may be aligned in the X direction.

With this configuration, the volumes between the pill passage holes and the pill number setting member 130 in the respective pill pockets 121 can be set at the same level by using the pill number setting member 130 which is easy to manufacture, such as one having protrusions 132 aligned in the X direction. Therefore, the numbers of pills T that can be accommodated in the respective pill pockets 121 can be set to be the same.

The pill container 1 according to the present embodiment may further include hinge cap portions 210 configured to be capable of individually opening and closing the pill passage holes of the respective pill pockets 121.

With this configuration, by opening one of the hinge cap portions 210, the user can take out only the pills T accommodated in the opened pill pocket 121, from the pill container 1. Accordingly, the user does not have to perform the taking-out operation while counting the pills T, so that the troublesome operation can be reduced. In addition, the risk of the user miscounting the pills T and taking an inappropriate number of pills T can also be reduced.

In the pill container 1 according to the present embodiment, the left wall 122 and the right wall 123 may be parallel along the Z direction such that the positions of the mountain portions of the left wall 122 and the positions of the valley portions of the right wall 123 in the Z direction coincide with each other.

With this configuration, the pills T are accommodated in each pill pocket 121 along the left wall 122 and the right wall 123 having a corrugated plate shape, so that the pills T in the pill pocket 121 can be more reliably aligned in a zigzag manner.

In the pill container 1 according to the present embodiment, the component d in the X direction of the distance between the mountain portions of the left wall 122 and the mountain portions of the right wall 123 may be smaller than the distance between a mountain portion of the left wall 122 and a valley portion of the left wall 122 adjacent to this mountain portion. For example, the component d in the X direction of the distance between the mountain portions of the left wall 122 and the mountain portions of the right wall 123 is smaller than the diameter D of the pill T.

With this configuration, when the pills T are loaded into each pill pocket 121 through the pill passage hole, there is a higher probability that a falling distance for which a pill T falls at one time is smaller than the height from the pill number setting member 130 to the pill passage hole. For example, in the case where the distance d is smaller than the diameter D of the pill T, each pill T loaded through the pill passage hole comes into contact with a mountain portion of the left wall 122 or a mountain portion of the right wall 123, and thus does not fall directly onto the pill number setting member 130 without coming into contact with any portion. Since a falling distance for which a pill T falls at one time is smaller than the height from the pill number setting member 130 to the pill passage hole as described above, the magnitude of the impact caused by the fall is reduced, so that the risk of breaking the pill T due to the fall can be reduced.

MODIFICATIONS

Although the embodiment of the present invention has been described above, the descriptions thereof are merely examples of the present invention. Various improvements and modifications can be made to the above exemplary embodiment. For example, the following modifications are possible. The following modifications can be combined as appropriate.

First Modification

Figure 12:
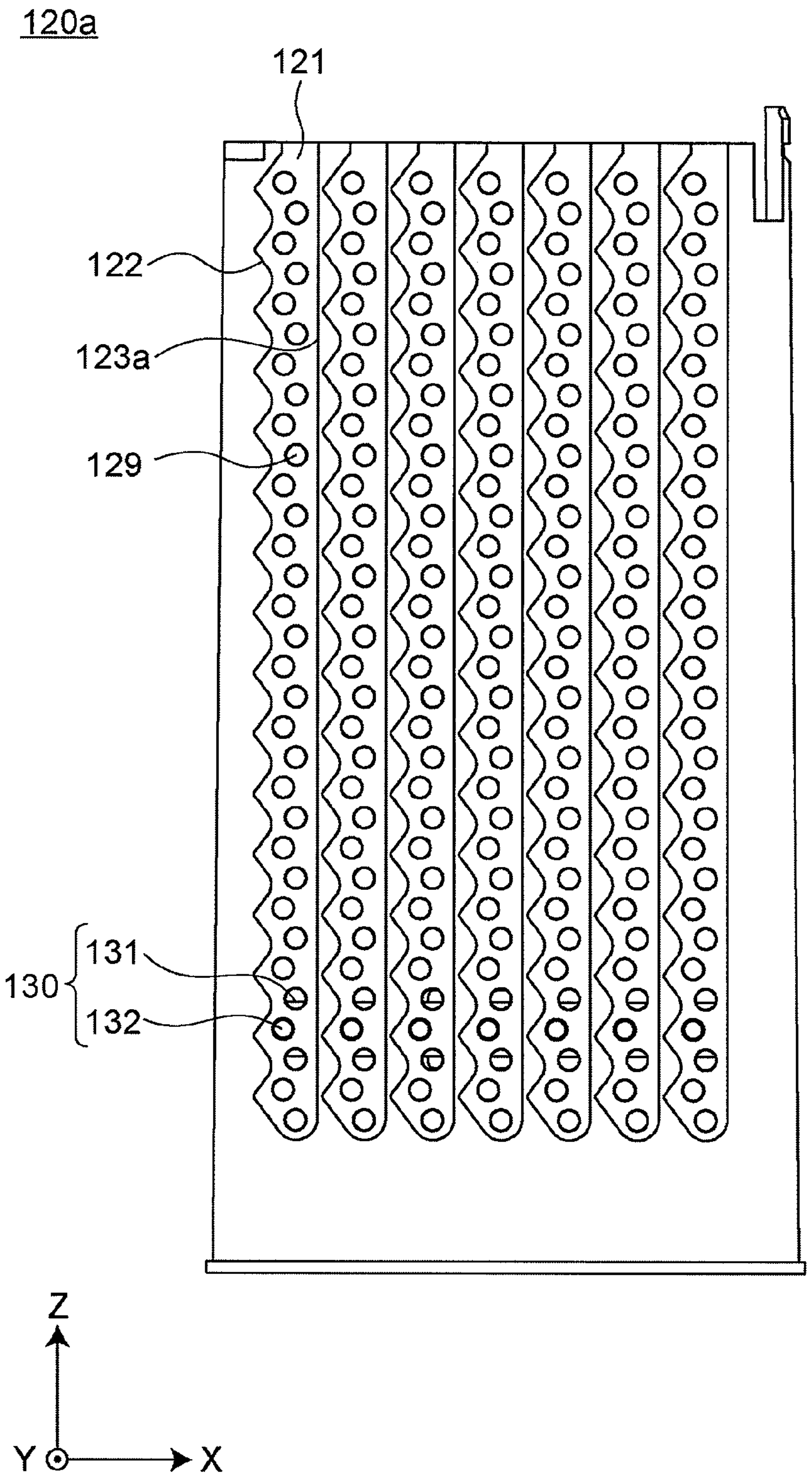
FIG. 12 is a front view of a pocket member **120*a*** according to a first modification of the embodiment of the present invention.

FIG. 12 is a front view of a pocket member 120*a* according to a first modification of the embodiment of the present invention. The pocket member 120*a* in FIG. 12 is different from the pocket member 120 in FIG. 5, in the structure of a right wall 123*a*. Specifically, while the right wall 123 of the pocket member 120 in FIG. 5 has a corrugated plate shape, the right wall 123*a* of the pocket member 120*a* in FIG. 12 has a straight shape extending substantially in a straight manner.

The distance between the left wall 122 and the right wall 123*a* is larger than the distance between a mountain portion of the left wall 122 and a valley portion of the left wall 122 adjacent to this mountain portion and is smaller than twice this distance. For example, the distance between the left wall 122 and the right wall 123*a* is larger than the diameter D of the pill T and smaller than 2D. Accordingly, the pills T loaded through the pill passage holes can pass through the interiors of the pill pockets 121 and reach the protrusions 132 of the pill number setting member 130, and two pills T are not accommodated in parallel in each pill pocket 121 so as to be aligned in the X direction.

Figure 13:
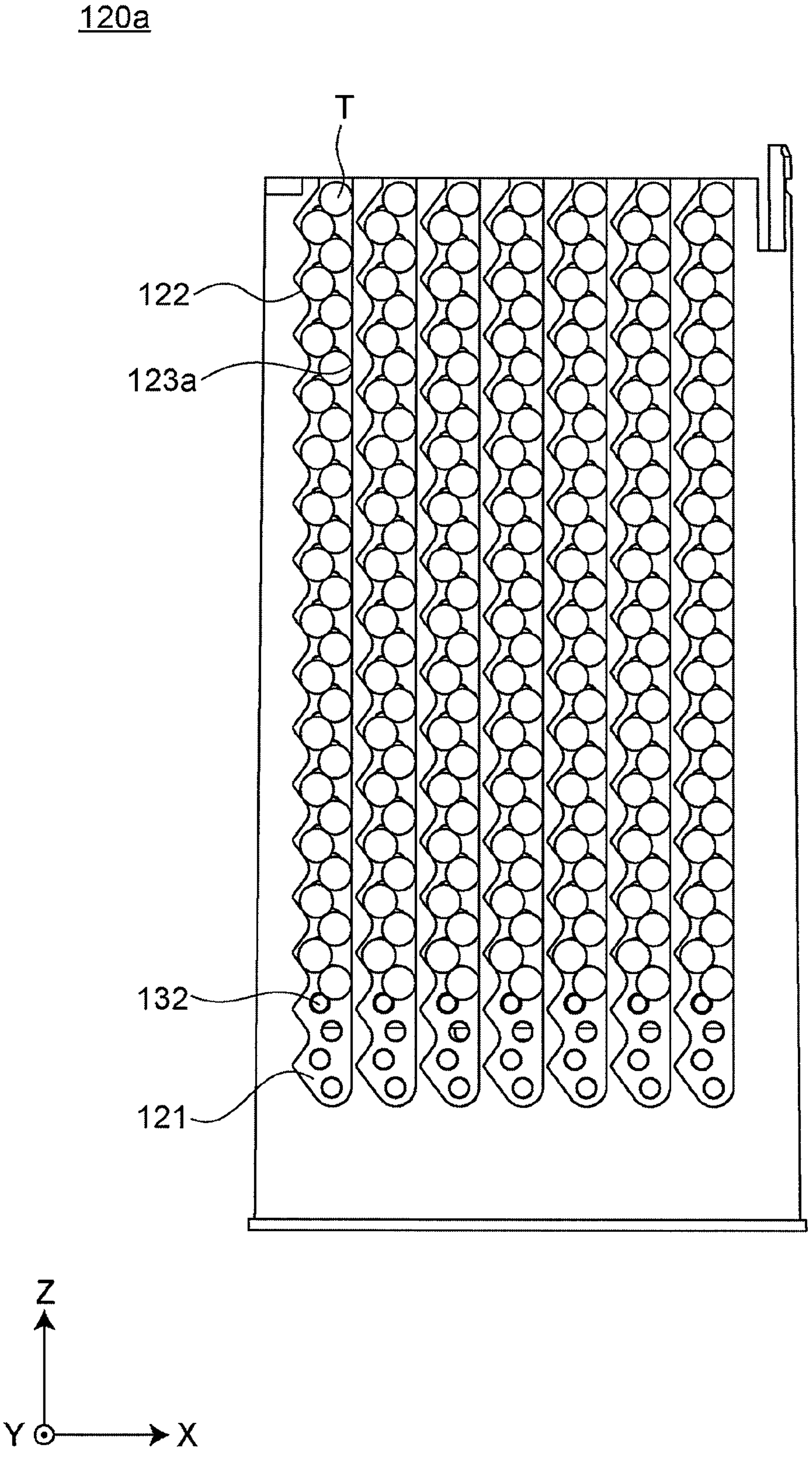
FIG. 13 is a front view showing a state where the pills T are accommodated in the pocket member **120*a* in FIG. 12**.

FIG. 13 is a front view showing a state where the pills T are accommodated in the pocket member 120*a* in FIG. 12. With the pocket member 120*a* according to the first modification of the embodiment of the present invention as well, as in the above embodiment, the pills T are accommodated in a zigzag manner in each pill pocket 121, so that a deviation of the number of pills T accommodated in the pill pocket 121 from a desired number due to accumulation of the dimensional errors of the pills T can be prevented.

Furthermore, in the first modification, when the user inverts the pill container 1 and takes out the pills T accommodated in the pill pocket 121, since the right wall 123*a* does not have a corrugated plate shape, there is a lower possibility that the pills T come into contact with the left wall 122 or the right wall 123*a*. Therefore, according to the first modification, the user can quickly take out the pills T, so that the usability of the pill container 1 is improved.

Second Modification

Figure 14:
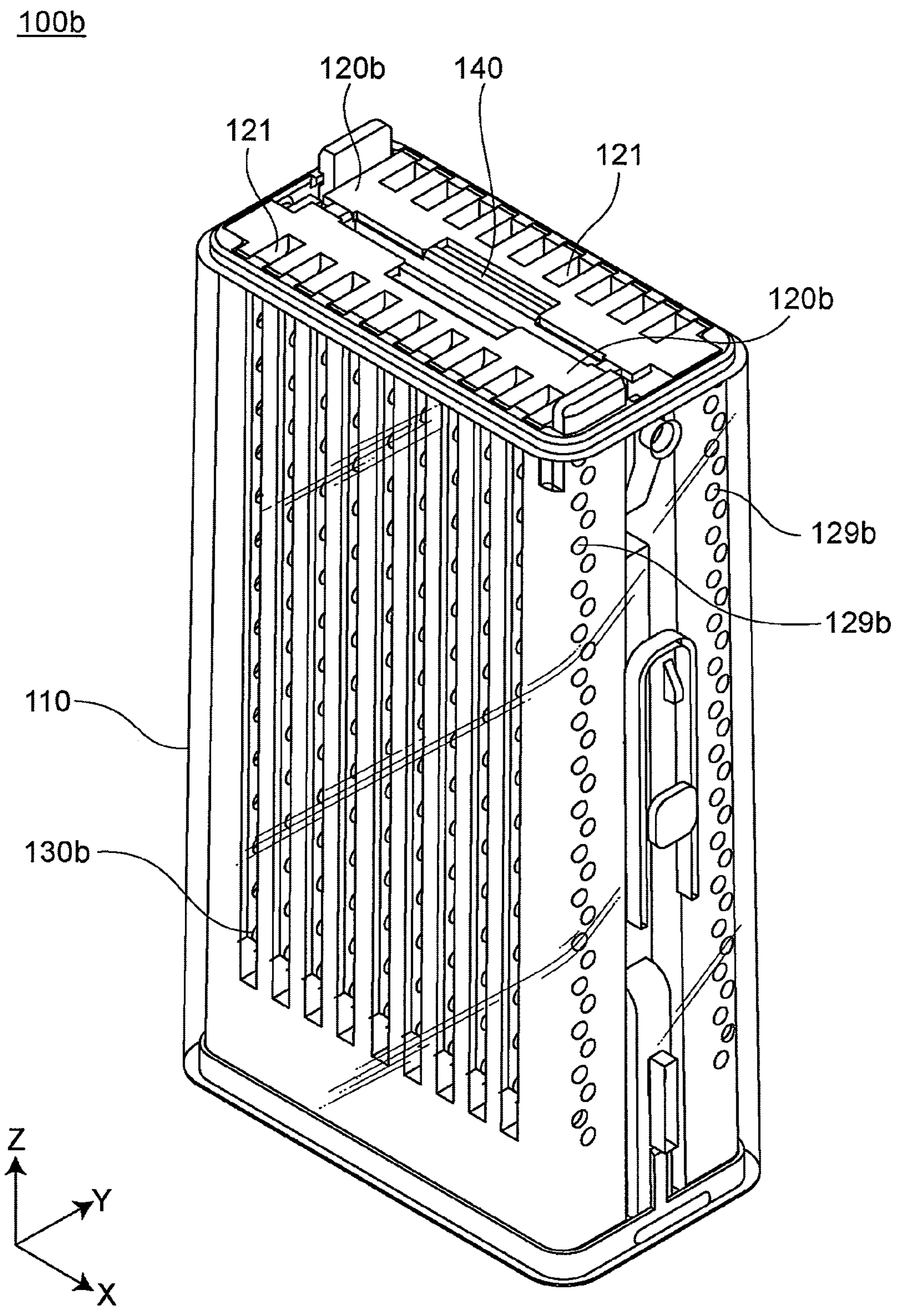
FIG. 14 is a perspective view of a container body **100*b*** according to a second modification of the embodiment of the present invention.
Figure 15:
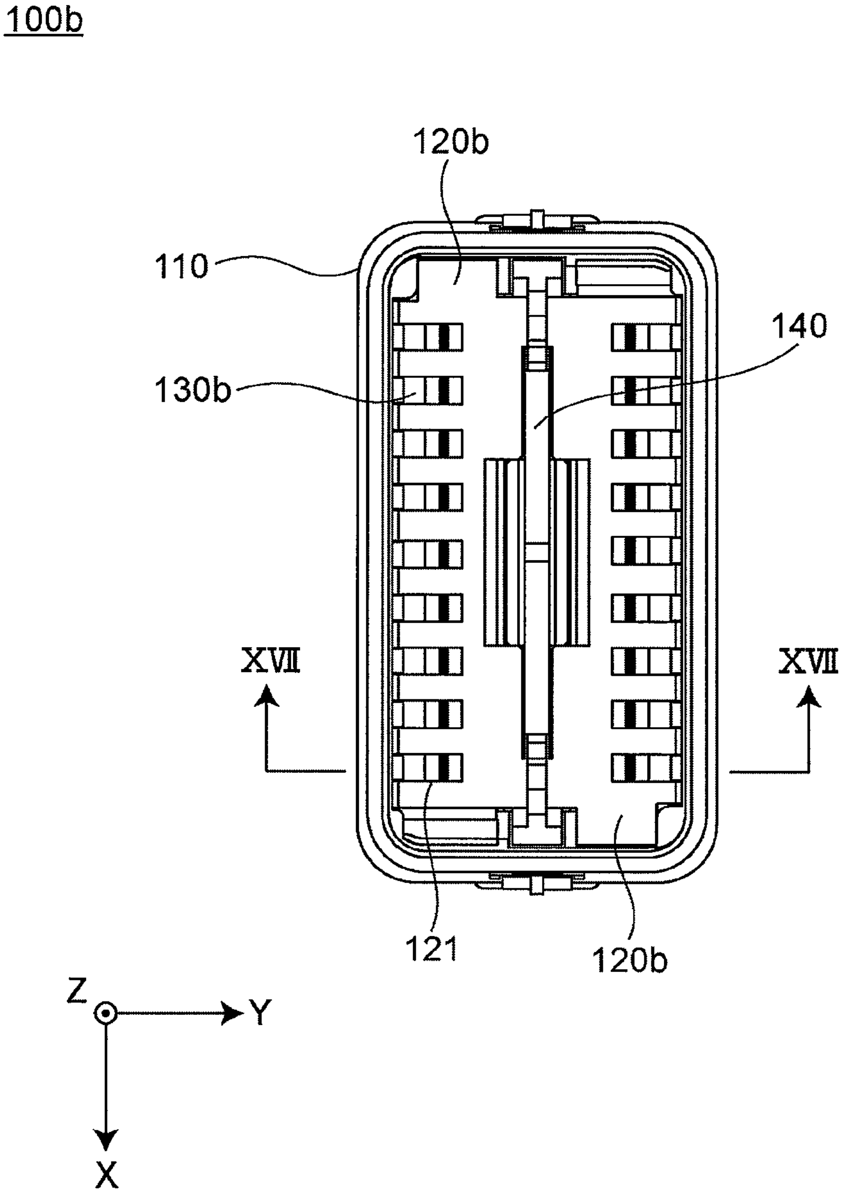
FIG. 15 is a plan view of the container body **100*b* in FIG. 14**.

FIG. 14 is a perspective view of a container body 100*b* according to a second modification of the embodiment of the present invention. FIG. 15 is a plan view of the container body 100*b* in FIG. 14. The container body 100*b* includes pocket members 120*b* instead of the pocket members 120 of the above embodiment.

Figure 16:
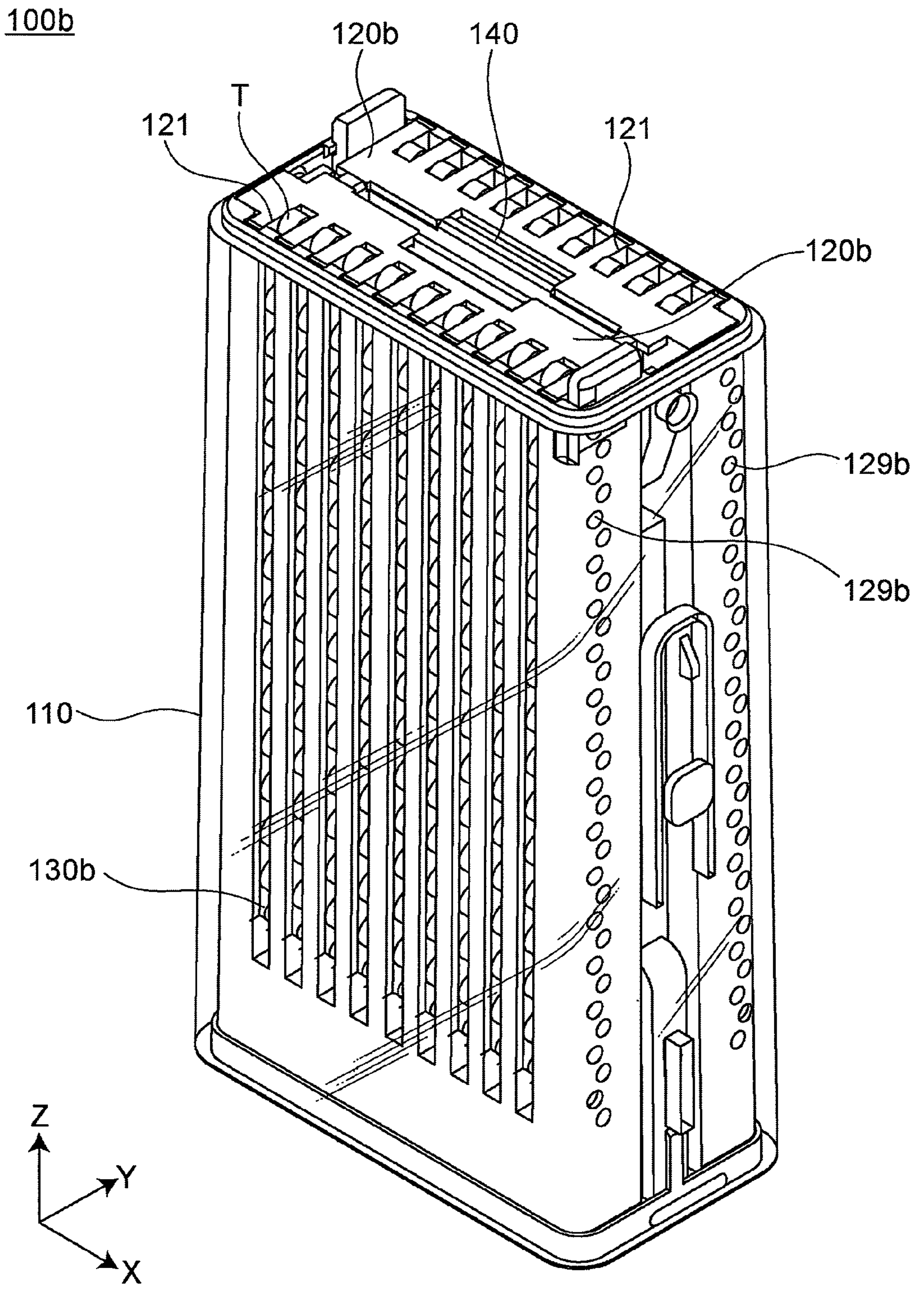
FIG. 16 is a perspective view showing a state where the pills T are accommodated in the container body **100*b* in FIG. 14**.

FIG. 16 is a perspective view showing a state where the pills T are accommodated in the container body 100*b* in FIG.

Figure 17:
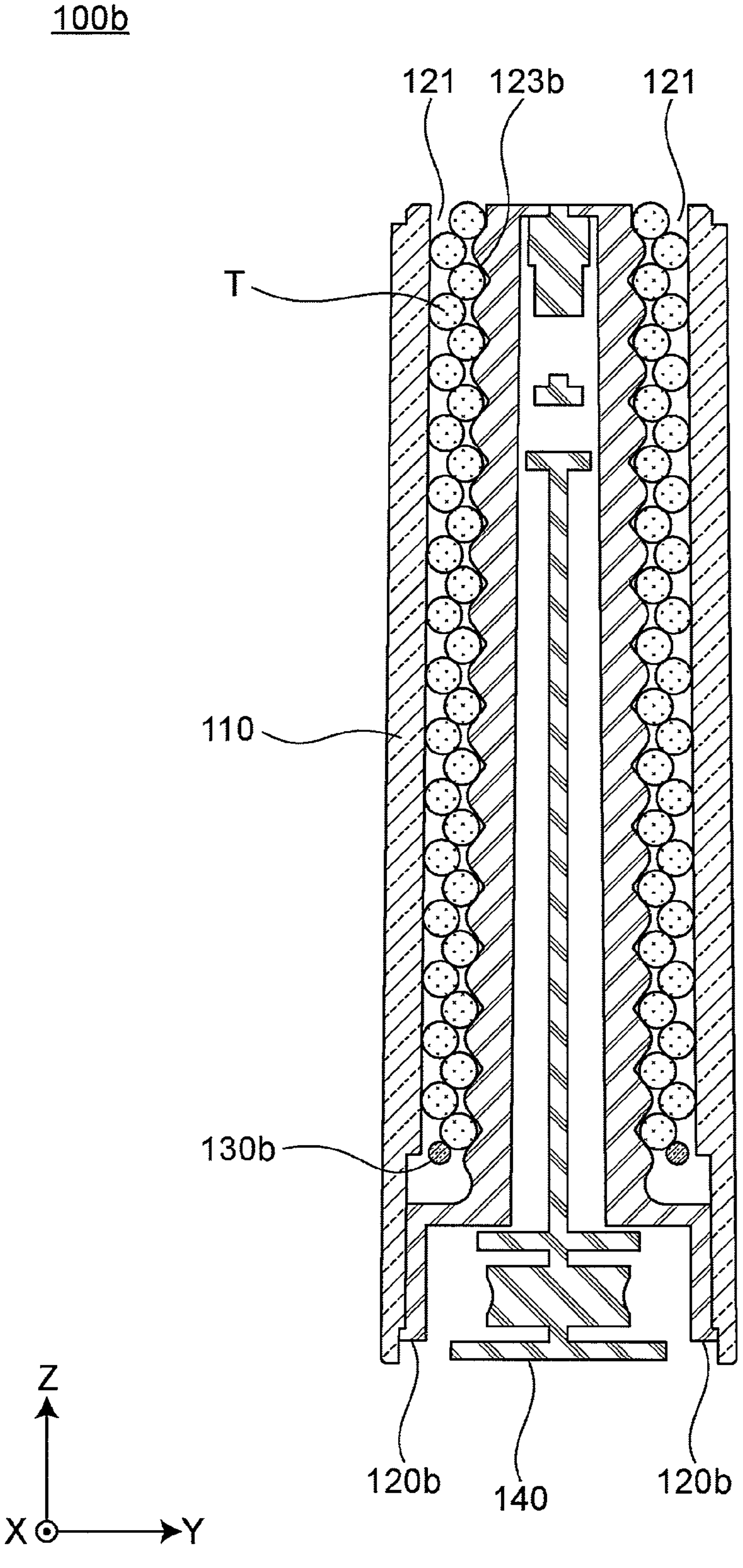
FIG. 17 is an end view of the container body **100*b* showing a cross section along a line XVII-XVII in FIG. 15**.

14. FIG. 17 is an end view of the container body **100*b* showing a cross section along a line XVII-XVII in FIG. 15. For convenience of description, FIG. 17 shows the pills T accommodated in the pill pockets 121**.

In the container body 100 illustrated in FIG. 1 and FIG. 2, the cylindrical pills T are accommodated in the pill pockets 121 such that bottom surfaces thereof face the front (Y direction). In other words, a straight line passing through the center of one bottom surface of each cylindrical pill T and the center of the other bottom surface thereof is substantially parallel to the Y axis.

On the other hand, as shown in FIG. 16, in the container body **100*b* according to the second modification, the cylindrical pills T are accommodated in the pill pockets 121 such that the side surfaces thereof face the front. In addition, in the container body 100*b*, attachment holes 129*b* are formed as through holes that penetrate from one side surface to another side surface of each pocket member 120*b*. A rod-shaped pill number setting member 130*b* is inserted into the attachment hole 129*b* so as to penetrate from the one side surface to the other side surface of the pocket member 120*b***.

As shown in FIG. 17, each pill pocket 121 includes an inner wall **123*b* formed in a corrugated plate shape. Therefore, the pills T accommodated in each pill pocket 121 are sandwiched between the inner wall 123*b* and the case 110** and aligned in a zigzag manner along the Z direction.

With this configuration as well, as in the above embodiment and first modification, since the pills T are accommodated in a zigzag manner in each pill pocket 121, a deviation of the number of pills T accommodated in the pill pocket 121 from a desired number due to accumulation of the dimensional errors of the pills T can be prevented.

DESCRIPTION OF THE REFERENCE CHARACTERS

1 pill container
100 container body
110 case
120 pocket member
121 pill pocket (pill accommodation portion)
122 left wall (wall portion)
123 right wall (wall portion)
129 attachment hole
130 pill number setting member
131 base
132 protrusion
140 support member
200 lid
201 pill passage hole
210 hinge cap portion
220 insertion member
300 loading jig
301 body
302 pill container attachment portion
311 movable insertion member
312 fixed insertion member
313 switch
314 pill path
315 pill stopper

The invention claimed is:

1. A pill container comprising a plurality of pill accommodation portions each extending in a first direction and having a volume allowing a predetermined plurality of pills to be accommodated therein, wherein the plurality of pill accommodation portions each include a pair of wall portions extending in the first direction and placed so as to oppose each other, at least one of the pair of wall portions is formed in a corrugated plate shape in which a plurality of mountain portions projecting inwardly toward the other wall portion and a plurality of outwardly recessed valley portions are alternately repeated along the first direction, wherein each of the pill accommodation portions has a pill passage hole allowing the plurality of pills to pass therethrough, at an upper end thereof which is one end in the first direction, the pill container further comprises a pill number setting member movable in the first direction within each of the pill accommodation portions, and the pill number setting member is configured to be capable of changing a volume between the pill passage hole and the pill number setting member in each of the pill accommodation portions by moving in the first direction in each of the pill accommodation portions.

2. The pill container according to claim 1, wherein each of the pill accommodation portions is provided with a plurality of attachment holes aligned at equal intervals in the first direction, and the pill number setting member is configured to be detachably inserted into one of the plurality of attachment holes and prevent the pills from moving in the first direction.

3. The pill container according to claim 2, wherein a number n of the plurality of attachment holes in each of the pill accommodation portions is equal to a sum of a number of the plurality of mountain portions and a number of the plurality of valley portions of each of the pill accommodation portions, a first attachment hole located at a lowermost portion among the plurality of attachment holes is located below a first valley portion located at a lowermost portion among the plurality of valley portions, a $2m^{th}$ attachment hole located at a $2m^{th}$ position from a bottom, wherein m is an integer which is not less than 1 and not greater than n/2, among the plurality of attachment holes is located between an $m^{th}$ valley portion located at an $m^{th}$ position from the bottom among the plurality of valley portions and an $m^{th}$ mountain portion located at an $m^{th}$ position from the bottom among the plurality of mountain portions, and a $(2m+1)^{th}$ attachment hole located at a $(2m+1)^{th}$ position from the bottom, wherein m is an integer which is not less than 1 and not greater than (n/2−1), among the plurality of attachment holes is located between an mth mountain portion located at an mth position from the bottom among the plurality of mountain portions and an $(m+1)^{th}$ valley portion located at an $(m+1)^{th}$ position from the bottom among the plurality of valley portions.

4. The pill container according to claim 2, wherein the plurality of pill accommodation portions are aligned in a second direction crossing the first direction, and the plurality of attachment holes are aligned in the second direction.

5. The pill container according to claim 1, further comprising a cap configured to be capable of individually opening and closing the pill passage hole of each of the pill accommodation portions.

6. The pill container according to claim 1, wherein the other of the pair of wall portions extends substantially in a straight manner in the first direction.

7. The pill container according to claim 1, wherein the other of the pair of wall portions is formed in a corrugated plate shape in which a plurality of mountain portions projecting inwardly toward the one wall portion and a plurality of outwardly recessed valley portions are alternately repeated along the first direction, and the pair of wall portions are parallel along the first direction such that positions of the mountain portions of the one wall portion and positions of the valley portions of the other wall portion in the first direction coincide with each other.

8. The pill container according to claim 7, wherein a component, in a direction perpendicular to the first direction, of a distance between the mountain portions of the one wall portion and the mountain portions of the other wall portion is smaller than a distance between a mountain portion of the one wall portion and a valley portion of the one wall portion adjacent to said mountain portion.

9. The pill container according to claim 8, wherein a value obtained by subtracting a diameter of the plurality of pills from a distance between the one wall portion and the other wall portion is not less than 0.02 times the diameter of the plurality of pills and not greater than 0.20 times the diameter of the plurality of pills.

* * * * *